US00RE50278E

(19) United States
(12) Reissued Patent
Kazmi et al.

(10) Patent Number: US RE50,278 E
(45) Date of Reissued Patent: Jan. 21, 2025

(54) SYSTEMS AND METHODS TO DERIVE CONFIGURED OUTPUT POWER WITH DIFFERENT TTI

(71) Applicant: Telefonaktiebolaget LM Ericsson (publ), Stockholm (SE)

(72) Inventors: Muhammad Kazmi, Bromma (SE); Christian Bergljung, Lund (SE); Christopher Callender, Kinross (GB); Dominique Everaere, Åkersberga (SE); Imadur Rahman, Sollentuna (SE); Laetitia Falconetti, Järfälla (SE); Mårten Sundberg, Årsta (SE)

(73) Assignee: Telefonaktiebolaget LM Ericsson (publ), Stockholm (SE)

(21) Appl. No.: 18/095,661

(22) Filed: Jan. 11, 2023

Related U.S. Patent Documents

Reissue of:
(64) Patent No.: 10,893,491
Issued: Jan. 12, 2021
Appl. No.: 16/308,001
PCT Filed: Nov. 3, 2017
PCT No.: PCT/EP2017/078179
§ 371 (c)(1),
(2) Date: Dec. 7, 2018
PCT Pub. No.: WO2018/083234
PCT Pub. Date: May 11, 2018

U.S. Applications:
(60) Provisional application No. 62/475,984, filed on Mar. 24, 2017, provisional application No. 62/418,041, filed on Nov. 4, 2016.

(51) Int. Cl.
*H04W 52/36* (2009.01)
*H04W 52/14* (2009.01)
*H04W 52/34* (2009.01)

(52) U.S. Cl.
CPC ..... *H04W 52/367* (2013.01); *H04W 52/146* (2013.01); *H04W 52/34* (2013.01); *H04W 52/365* (2013.01)

(58) Field of Classification Search
CPC . H04W 52/18; H04W 52/367; H04W 52/365; H04W 52/146; H04W 52/34;
(Continued)

(56) References Cited

U.S. PATENT DOCUMENTS

2008/0159184 A1* 7/2008 Niwano ..... H04W 52/346 370/278
2011/0177806 A1* 7/2011 Kazmi ..... H04W 52/367 455/422.1
(Continued)

FOREIGN PATENT DOCUMENTS

CN 103797865 A 5/2014
CN 104412673 A 3/2015
(Continued)

OTHER PUBLICATIONS

Office Action issued for Chinese Patent Application Serial No. 201780082329.9—Jul. 27, 2021.
(Continued)

*Primary Examiner* — Minh Dieu Nguyen
(74) *Attorney, Agent, or Firm* — Baker Botts L.L.P.

(57) ABSTRACT

According to certain embodiments, a method by a wireless device is provided for determining a maximum output power. The method includes obtaining, by the wireless device, a first time resource for transmitting a first signal in βa first cell on a first carrier and a second time resource for transmitting a second signal in a second cell on a second carrier. Based on the first time resource and the second time resource, the maximum output power is 10 determined. The
(Continued)

first signal and the second signal are transmitted based on the determined maximum output power.

18 Claims, 22 Drawing Sheets

(58) Field of Classification Search
CPC ..... H04W 72/1236; H04W 72/0446; H04W 72/1284; H04W 72/042; H04L 5/0007
See application file for complete search history.

(56) References Cited

U.S. PATENT DOCUMENTS

| | | | | |
|---|---|---|---|---|
| 2012/0106477 | A1* | 5/2012 | Kwon | H04W 52/365 370/328 |
| 2013/0040688 | A1* | 2/2013 | Mizusawa | H04W 52/367 455/522 |
| 2016/0119910 | A1* | 4/2016 | Krzymien | H04B 7/0639 370/329 |
| 2016/0212769 | A1* | 7/2016 | Huang | H04W 72/0446 |
| 2016/0323834 | A1 | 11/2016 | Rahman et al. | |
| 2016/0323885 | A1* | 11/2016 | Kazmi | H04L 5/143 |
| 2017/0290008 | A1* | 10/2017 | Tooher | H04L 1/0003 |
| 2017/0339648 | A1* | 11/2017 | Wang | H04W 52/38 |
| 2018/0176870 | A1* | 6/2018 | Dai | H04W 52/146 |
| 2018/0213489 | A1* | 7/2018 | Andou | H04W 52/38 |
| 2019/0342840 | A1* | 11/2019 | Rahman | H04L 5/0051 |

FOREIGN PATENT DOCUMENTS

| | | | |
|---|---|---|---|
| CN | 105580452 | A | 5/2016 |
| EP | 3 016 467 | A1 | 7/2013 |
| EP | 2 981 123 | A1 | 2/2016 |
| WO | 2015010332 | A1 | 1/2015 |
| WO | WO2015116866 | A1 | 8/2015 |
| WO | 2016114889 | A1 | 7/2016 |
| WO | 2017033490 | A1 | 3/2017 |

OTHER PUBLICATIONS

Search Report issued for Chinese Patent Application Serial No. 2017800823299—Jul. 16, 2021.
Notice of Allowance issued for Japanese Patent Application No. 2019-523707—Sep. 24, 2021.
International Search Report in International Application No. PCT/EP2017/078179, dated Jan. 17, 2018.

* cited by examiner

SYSTEMS AND METHODS TO DERIVE CONFIGURED OUTPUT POWER WITH DIFFERENT TTI

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

PRIORITY

[This nonprovisional application] *This patent application is for a broadening reissue of U.S. Pat. No. 10,893,491, which* is a U.S. National Stage Filing under 35 USC, § 371 of International Patent Application Serial No. PCT/EP2017/078179 filed Nov. 3, 2017, and entitled "Systems And Methods To Derive Configured Output Power With Different TTI" which claims priority to U.S. Provisional Patent Application No. 62/418,041 filed Nov. 4, 2016 and U.S. Provisional Patent Application No. 62/475,984 filed Mar. 24, 2017, all of which are hereby incorporated by reference in their entirety.

TECHNICAL FIELD

The present disclosure relates, in general, to wireless communications and, more particularly, systems and methods to derive configured output power with different transmission time index (TTI) patterns for carrier aggregation.

BACKGROUND

LTE uses OFDM in the downlink and DFT-spread OFDM in the uplink. In the time domain, LTE downlink transmissions are organized into radio frames of 10 ms, each radio frame consisting of ten equally-sized subframes of length $T_{subframe}$=1 ms. An example LTE time-domain structure is illustrated in FIG. 1.

The resource allocation in LTE is typically described in terms of resource blocks (RB). A resource block corresponds to one slot (0.5 ms) in the time domain and 12 contiguous subcarriers in the frequency domain. A pair of two adjacent resource blocks in time direction (1.0 ms) may be known as a resource block pair. This is also denoted as TTI (Transmission Time Index).

Downlink transmissions are dynamically scheduled. For example, in each subframe the base station transmits control information about to which terminals data is transmitted and upon which resource blocks the data is transmitted, in the current downlink subframe. This control signaling is typically transmitted in the first 1, 2, 3 or 4 OFDM symbols in each subframe aid the number n=1, 2, 3 or 4 is known as the Control Format Indicator (CFI) indicated by the physical CFI channel (PCFICH) transmitted in the first symbol of the control region. The control region also contains physical downlink control channels (PDCCH) and possibly also physical HARQ indication channels (PHICH) carrying ACK/NACK for the uplink transmission.

The downlink subframe also contains common reference symbols (CRS), which are known to the receiver and used for coherent demodulation of e.g. the control information. A downlink system with CFI=3 OFDM symbols as control is illustrated in FIG. 2. In a Rel-8 TTI, one such portion of the DL transmission is termed as one TTI.

Uplink power control plays an important role in radio resource management which has been adopted in most modem communication systems. It balances the needs to maintain the link quality against the needs to minimize interference to other users of the system and to maximize the battery life of the terminal.

In LTE, the objective of power control is to determine the average power over a SC-FDMA symbol and it is applied for both common channel and dedicated channel (PUCCH/PUSCH/SRS). A combined open-loop and closed-loop power control was adopted as formulated in Equation 1 disclosed below:

Open loop power control: The wireless device (UE) calculates basic open-loop set-point based on the path-loss estimate and eNodeB controlled semi-static base level ($P_o$) comprising a nominal power level common for all UEs in the cell and a UE-specific offset;

Closed-loop power control: eNodeB updates the dynamic adjustment relative to set-point; the wireless device (UE) adjusts the transmit power upon the TPC commands. It is also possible to connect the power control to modulation and coding scheme used for the uplink transmission.

$$P_{UE} = \min\left\{P_{CMAX}, \underbrace{P_0 + \alpha \cdot PL}_{open-loop\ set-point} + \underbrace{f(i)}_{closed-loop\ adjustment} + \underbrace{\Delta_{TF}(i)}_{MCS\ offset} + \underbrace{\Delta\log_{10}M}_{bandwidth\ factor}\right\} \quad \text{(Equation 1)}$$

Uplink power control is used both on the PUSCH and on PUCCH. The purpose is to ensure that the mobile terminal transmits with sufficiently high but not too high power since the latter would increase the interference to other users in the network. In both cases, a parameterized open loop combined with a closed loop mechanism is used. Roughly, the open loop part is used to set a point of operation, around which the closed loop component operates. Different parameters (targets and 'partial compensation factors') for user and control plane are used.

In more detail, for PUSCH the mobile terminal sets the output power according to the following equation:

$$P_{PUSCHc}(i)=\min\{P_{MAXc}, 10\log_{10}(M_{PUSCHc}(i))+P_{O_PUSCHc}(j)+\alpha_c\cdot PL_c+\Delta_{TFc}(i)+f_c(i)\} \quad \text{[dBm]},$$

where $P_{MAXc}$ is the maximum transmit power for the mobile terminal, $M_{PUSCHc}(i)$ is the number resource blocks assigned, $P_{O_PUSCHc}(j)$ and $\alpha_c$, control the target received power, $PL_c$ is the estimated pathloss, $\Delta_{TFc}(i)$ is transport format compensator and $f_c(i)$ is the a UE specific offset or 'closed loop correction' (the function $f_c$ may represent either absolute or accumulative offsets). The index c numbers the component carrier and is only of relevance for Carrier Aggregation.

The closed loop power control can be operated in two different modes either accumulated or absolute. Both modes are based on TPC a command which is part of the downlink control signaling. When absolute power control is used, the closed loop correction function is reset every time a new power control command is received. When accumulated power control is used, the power control command is a delta correction with regard to the previously accumulated closed loop correction. The accumulated power control command is defined as $f_c(i)=f_c(i-1)+\delta_{PUSCHc}(i-K_{PUSCH})$, where $\delta_{PUSCHc}$ is the TPC command received in $K_{PUSCH}$ subframe before the current subframe i and $f_c(i-1)$ is the accumulated power control value. The absolute power control has no memory, i.e. $f_c(i)=\delta_{PUSCHc}(i-K_{PUSCH})$.

The PUCCH power control has in principle the same configurable parameters with the exception that PUCCH only has full pathloss compensation, i.e. does only cover the case of $\alpha=1$ Typically, configured transmitted power PCMAX is defined in Section 6.2.5 of 3GPP TS 36.101 as written below:

6.2.5 Configured transmitted power

The UE is allowed to set its configured maximum output power $P_{CMAX,c}$ for serving cell c. The configured maximum output power $P_{CMAX,c}$ is set within the following bounds:

$$P_{CMAX_L,c} \leq P_{CMAX,c} \leq P_{CMAX_H,c} \text{ with}$$

$$P_{CMAX_L,c}=\text{MIN}\{P_{EMAX,c}-\Delta T_{C,c}, P_{PowerClass}-\text{MAX}(\text{MPR}_c+\text{A-MPR}_c+\Delta T_{IB,c}, \text{P-MPR}_c)\}$$

$$P_{CMAX_H,c}=\text{MIN}\{P_{EMAX,c}, P_{PowerClass}\}$$

where $P_{EMAX,c}$ is the value given by IE P-Max for serving cell c, defined in 3GPP TS 36.331;

$P_{PowerClass}$ is the maximum UE power specified in Table 6.2.2-1 without taking into account the tolerance specified in the Table 6.2.2-1;

$\text{MPR}_c$, and $\text{A-MPR}_c$, for serving cell c are specified in subclause 6.2.3 and subclause 6.2.4, respectively;

$\Delta T_{IB,c}$ is the additional tolerance for serving cell c as specified in Table 6.2.5-2; $\Delta T_{IB,c}=0$ dB otherwise;

$\Delta T_{C,c}=1.5$ dB when Note 2 in Table 6.2.2-1 applies;

$\Delta T_{C,c}=0$ dB when Note 2 in Table 6.2.2-1 does not apply.

$\text{P-MPR}_c$ is the allowed maximum output power reduction for a) ensuring compliance with applicable electromagnetic energy absorption requirements and addressing unwanted emissions/self-defence requirements in case of simultaneous transmissions on multiple RAT(s) for scenarios not in scope of 3GPP RAN specifications;

b) ensuring compliance with applicable electromagnetic energy absorption requirements in case of proximity detection is used to address such requirements that require a lower maximum output power.

The UE shall apply $\text{P-MPR}_c$ for serving cell c only for the above cases. For UE conducted conformance testing P-MPR shall be 0 dB NOTE 1: $\text{P-MPR}_c$ was introduced in the $P_{CMAX,c}$ equation such that the UE can report to the eNB the available maximum output transmit power. This information can be used by the eNB for scheduling decisions.

NOTE 2: $\text{P-MPR}_c$ may impact the maximum uplink performance for the selected UL transmission path.

For each subframe, the $P_{CMAX_L,c}$ for serving cell c is evaluated per slot and given by the minimum value taken over the transmission(s) within the slot; the minimum $P_{CMAX_L,c}$ over the two slots is then applied for the entire subframe. $P_{powerclass}$ shall not be exceeded by the UE during any period of time.

The measured configured maximum output power $P_{UMAX,c}$ shall be within the following bounds:

$$P_{CMAX_L,c}-\text{MAX}\{T_L, T(P_{CMAX_L,c})\} \leq P_{UMAx,c} \leq P_{CMAX_H,c}+T(P_{CMAX_H,c})$$

where $T(P_{CMAX,c})$ is defined by the tolerance table below and applies to $P_{CMAX_L,c}$ and $P_{CMAx_Hc}$, separately, while $T_L$ is the absolute value of the lower tolerance in Table 6.2.2-1 for the applicable operating band.

TABLE 6.2.5-1

| $P_{CMAX}$ tolerance | |
|---|---|
| $P_{CMAX,c}$ (dBm) | Tolerance $T(P_{CMAX,c})$ (dB) |
| $23 < P_{CMAX,c} \leq 33$ | 2.0 |
| $21 \leq P_{CMAX,c} \leq 23$ | 2.0 |
| $20 \leq P_{CMAX,c} < 21$ | 2.5 |
| $19 \leq P_{CMAX,c} < 20$ | 3.5 |
| $18 \leq P_{CMAX,c} < 19$ | 4.0 |
| $13 \leq P_{CMAX,c} < 18$ | 5.0 |
| $8 \leq P_{CMAX,c} < 13$ | 6.0 |
| $-40 \leq P_{CMAX,c} < 8$ | 7.0 |

For the UE that supports inter-band carrier aggregation configurations with uplink assigned to one E-UTRA band the $\Delta T_{TB,c}$ is defined for applicable bands in Table 6.2.5-2.

Packet data latency is one of the performance metrics that vendors, operators and also end-users (via speed test applications) regularly measures. Latency measurements are done in all phases of a radio access network system lifetime, when verifying a new software release or system component, when deploying a system and when the system is in commercial operation.

Shorter latency than previous generations of 3GPP RATs was one performance metric that guided the design of Long Term Evolution (LTE). LTE is also now recognized by the end-user to be a system that provides faster access to internet and lower data latencies than previous generations of mobile radio technologies.

Packet data latency is important not only for the perceived responsiveness of the system; it is also a parameter that indirectly influences the throughput of the system. HTTP/TCP is the dominating application and transport layer protocol suite used on the interact today. According to HTTP Archive (http://httparchive.org/trends.php) the typical size of HTTP based transactions over the interact are in the range of a few 10's of Kbyte up to 1 Mbyte. In this size range, the TCP slow start period is a significant part of the total transport period of the packet stream. During TCP slow start the performance is latency limited. Hence, improved latency can rather easily be showed to improve the average throughput, for this type of TCP based data transactions.

Radio resource efficiency could be positively impacted by latency reductions. Lower packet data latency could increase the number of transmissions possible within a certain delay bound; hence higher Block Error Rate (BLER) targets could be used for the data transmissions freeing up radio resources potentially improving the capacity of the system.

One area to address when it comes to packet latency reductions is the reduction of transport time of data and control signaling, by addressing the length of a transmission time interval (TTI). In LTE release 8, a TTI corresponds to one subframe (SF) of length 1 millisecond. One such 1 ms TTI is constructed by using 14 OFDM or SC-FDMA symbols in the case of normal cyclic prefix and 12 OFDM or SC-FDMA symbols in the case of extended cyclic prefix. In LTE release 13, a study item is starting during 2015, with the goal of specifying transmissions with shorter TTIs that are much shorter than the LTE release 8 TTI. The shorter TTIs can be decided to have any duration in time and comprise resources on a number of OFDM or SC-FDMA symbols within a 1 ms SF. As one example, the duration of the short TTI may be 0.5 ms, i.e. seven OFDM or SC-FDMA symbols for the case with normal cyclic prefix. As another example, the duration of the short TTI may be 2 symbols.

As shown in FIG. 2, the TTI length consists of 14 OFDM symbols. In case of shortened TTI, the TTI length can be reduced to 2-OFDM symbols, 4-OFDM symbols or 7-OFDM symbols. These are denoted as: 2-OS sTTI, 4-OS sTTI, 7-OS sTTI, respectively.

The shortened TTI can be used in different values in different direction, such as DL and UL. For example: a DL can use 2-OS sTTI, while UL can use 4-OS sTTI in the same cell.

For different frame structures, such as FS1, FS2 and FS3, the sTTI that is used could be different too. The time domain structure in FIG. 1 relates to FS1, 2-OS, 4 OS and 7 OS TTI are usable for FS1. For FS2 which is used for TDD, 7-OS sTTI is one of the shortened TTI mode. FIG. 3 illustrates an example 7-symbol sTTI structure supported for UL according to agreements in R1-1611055. If a 4-symbol UL sTTI is supported, the sTTI structure illustrated in FIG. 4 has been adopted according to agreements in R1-1611055.

In the current specifications, the minimum UE transmit max power $P_{CMAX_L,c}$ shall be evaluated per slot by the UE every subframe. This makes sense as the minimum resource unit is 1 RB, which corresponds to a 1 ms TTI value. With the introduction of the shorten TTI feature, UE would be scheduled on a smaller TTI basis. There is no rule for estimating Pcmax when the UE is configured with shorter TTI.

Carrier aggregation is one of the ways of increasing the per user throughput for users with good channel conditions and with the capability of receiving and transmitting at higher data rate. A user can be configured to in two or three (or more) simultaneous bands in DL and/or in UL.

FIG. 5A illustrates a network node capable of running different cells at the same time. Specifically, FIG. 5A illustrates a network node running four different cells at the same time. These cells are operated either in different bands or they could also be operated in the same band. In Rel-8, only one cell is used for communication between eNB and UE.

However there may be CA cases based on different number of CCs in downlink (DL) and/or uplink (UL). For example, there may be a two-DL CA scenario (i.e., CA with 2 DL CCs and 1 UL CC). As compared to FIG. 5A, FIG. 5B illustrates two of the cells being activated for one wireless device, which is the initial version of DL carrier aggregation. In this scenario, the wireless device is configured to receive in 2 DL bands simultaneously while still using UL in only one of the bands. The UL allocation in this case is arbitrary, meaning that either of the bands can be used for UL transmission.

In carrier aggregation terms, the cell where UL is allocated for certain wireless device is the PCell (primary cell), while the other aggregated cell is SCell (secondary cell). PCell and SCell combinations are wireless device-specific.

Additionally, three DL bands may be allocated to any wireless device 110. In this scenario, 3DL carrier aggregation is realized, as depicted in FIG. 5C. This scenario by may considered "3DL CA," where the CA includes 3DL CC and 1 or 2 UL CC. Similar to 2DL case, UL can be allocated to any of the bands.

In another scenario depicted in FIG. 5D, UL carrier aggregation may also be enabled for the wireless device. This may be considered "2UL CA," where the CA includes 2 UL CCS and 2 or 3 DL CCs. In this case, only 2UL and 2DL carrier aggregation is shown. In case of UL carrier aggregation, PCell and SCell definitions are still UE specific.

Depending on the carrier frequency, or depending on the physical eNB deployment, the deployment of CA-enabled system can be very different.

FIGS. 6A and 6B provide two examples of CA deployment. Specifically, FIG. 6A shows that F1 and F2 cells are co-located and overlaid, but F2 has smaller coverage due to larger path loss. Only F1 provides sufficient coverage and F2 is used to improve throughput. Mobility is performed based on F1 coverage. This is a likely scenario when F1 and F2 are of different bands, e.g., F1={800 MHz, 2 GHz} and F2={3.5 GHz}, etc. It is expected that aggregation is possible between overlaid F1 and F2 cells. FIG. 6B illustrates a different kind of deployment. In this case, F1 provides macro coverage and on F2 Remote Radio Heads (RRHs) are used to improve throughput at hot spots. Mobility is performed based on F1 coverage. Likely scenario is when F1 and F2 are of different bands, e.g., F1={800 MHz, 2 GHz}, and F2={3.5 GHz}, etc. It is expected that F2 RRHs cells can be aggregated with the underlying F1 macro cells.

In the current specifications, the minimum UE transmit max power $P_{CMAX_L,c}$ is evaluated per slot by the UE every subframe. In some aspects, the final $P_{CMAX_L,c}$ value will be the minimum of the two slots inside the subframe. This makes sense as the minimum resource unit is 1 RB, which corresponds to a 1 ms TTI value. With the introduction of the shortened TTI feature, UE would be scheduled on a smaller TTI basis. There is no rule for estimating Pcmax when the UE is configured with shorter TTI.

SUMMARY

To address the foregoing problems with existing solutions, disclosed are systems and methods to derive configured output power with different transmission time index (TTI) patterns.

According to certain embodiments, a method by a wireless device is provided for determining a maximum output power. The method includes obtaining, by the wireless device, a first time resource for transmitting a first signal in a first cell on a first carrier and a second time resource for transmitting a second signal in a second cell on a second carrier. Based on the first time resource and the second time resource, the maximum output power is determined. The first signal and the second signal are transmitted based on the determined maximum output power.

According to certain embodiments, a wireless device is provided for determining a maximum output power. The wireless device includes a memory storing instructions and a processor configured to execute the instructions to cause the wireless device to obtain a first time resource for transmitting a first signal in a first cell on a first carrier and a second time resource for transmitting a second signal in a second cell on a second carrier. Based on the first time resource and the second time resource, the wireless device determines the maximum output power is determined. Based on the determined maximum output power, the wireless device transmits the first signal in the first cell and the second signal in the second cell.

According to certain embodiments, a method by a network node is provided for determining a maximum output power. The method includes configuring a wireless device with a first time resource for transmitting a first signal in a first cell on a first carrier and a second time resource for transmitting a second signal in a second cell on a second carrier. A maximum output power is determined based on the first time resource and the second time resource. Based on the maximum output power, at least one of the first signal on the first cell and the second signal on the second cell are received.

According to certain embodiments, a network node for determining it maximum output power is provided. The network node includes a memory storing instructions and a processor configured to execute the instructions to cause the network node to configure a wireless device with a first time resource for transmitting a first signal in a first cell on a first carrier and a second time resource for transmitting a second signal in a second cell on a second carrier. The network node determines a maximum output power based on the first time resource and the second time resource. Based on the maximum output power, the network node receives at least one of the first signal on the first cell and the second signal on the second cell.

Certain embodiments of the present disclosure may provide one or more technical advantages. For example, certain embodiments may provide well defined wireless device behavior with respect to configured transmitted power. As another example, a technical advantage may be that the wireless device behavior with respect to configured transmitted power is well defined when different TTI patterns are used in different carriers in CA operation. As still another example, a technical advantage may be that the operation related to the transmission of signals by the wireless device configured with the same or different TTIs on different serving cells in CA is enhanced.

Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Particular embodiments are described in FIGS. 1-22 of the drawings, like numerals being used for like and corresponding parts of the various drawings.

Figure 1:
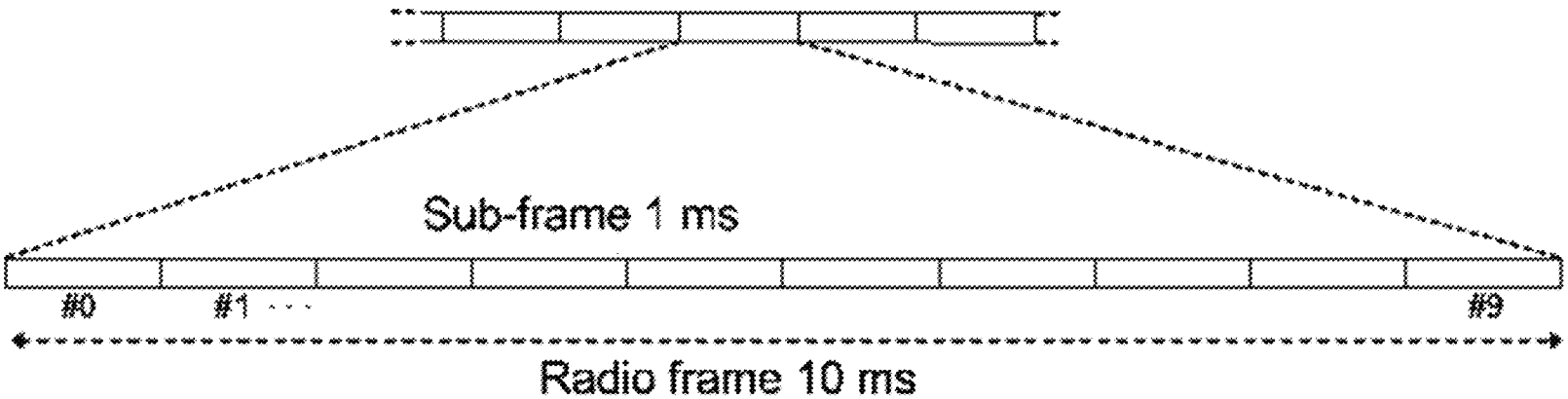
FIG. 1 illustrates an example LTE time-domain structure.
Figure 2:
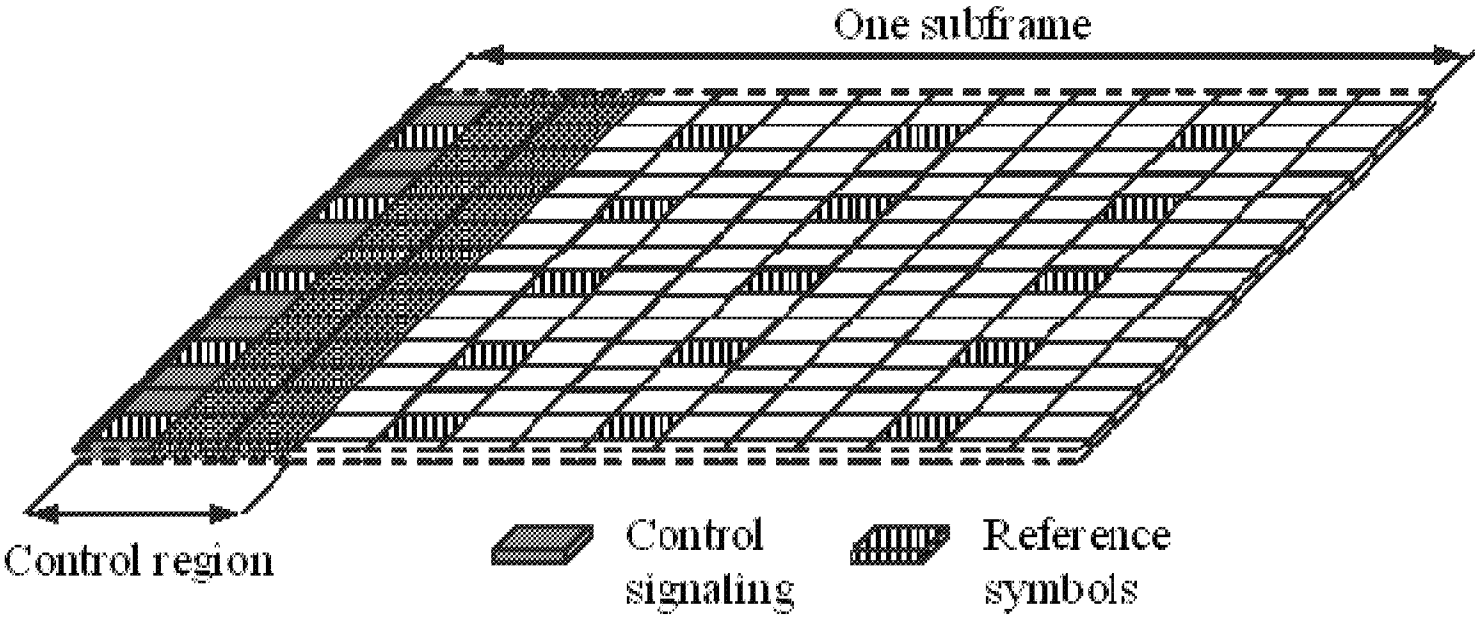
FIG. 2 illustrates an example downlink subframe.
Figure 3:
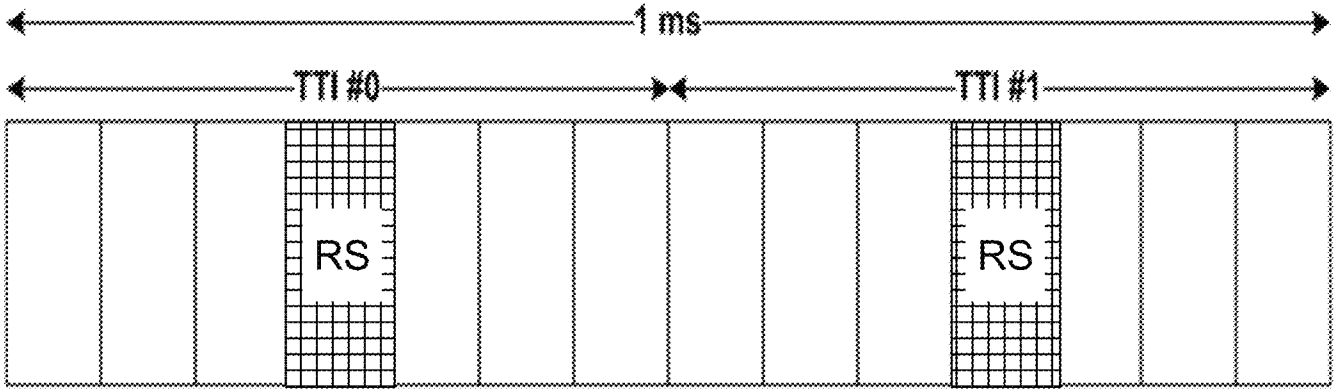
FIG. 3 illustrates an example 7-symbol sTTI structure supported for UL.
Figure 4:
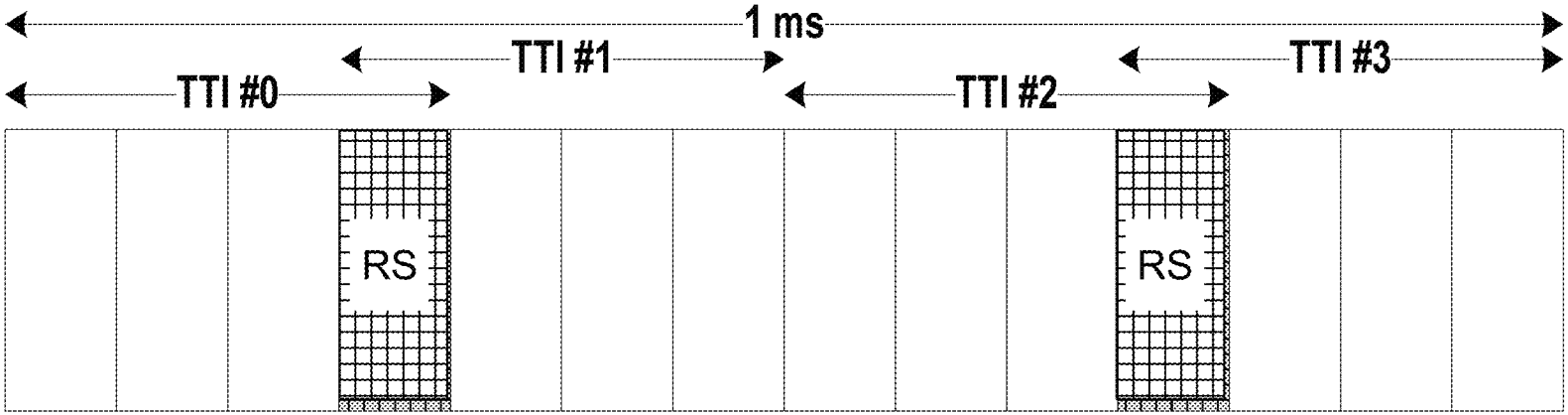
FIG. 4 illustrates an example, 4-symbol sill to be supported for UL.
Figure 5A:
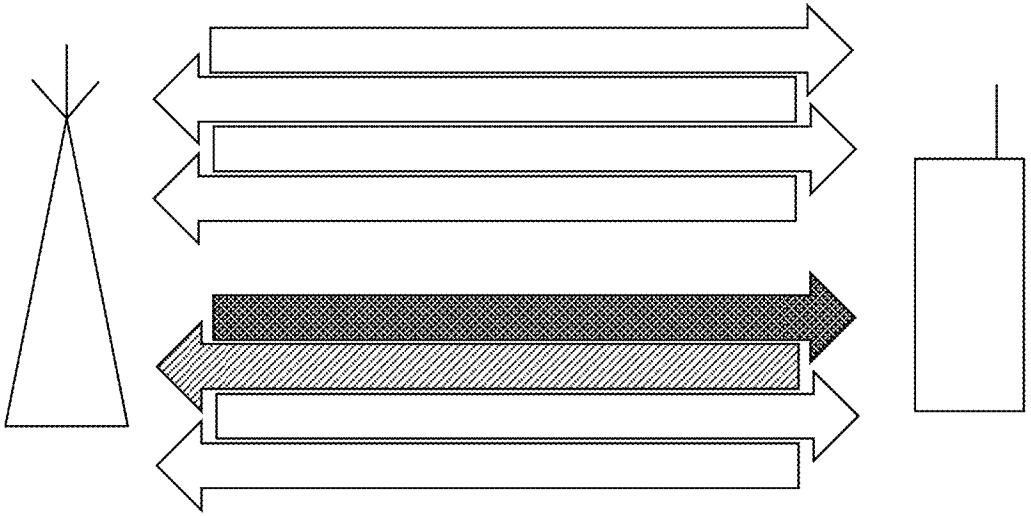
FIGS. 5A-5D illustrate example carrier aggregation scenarios.
Figure 5B:
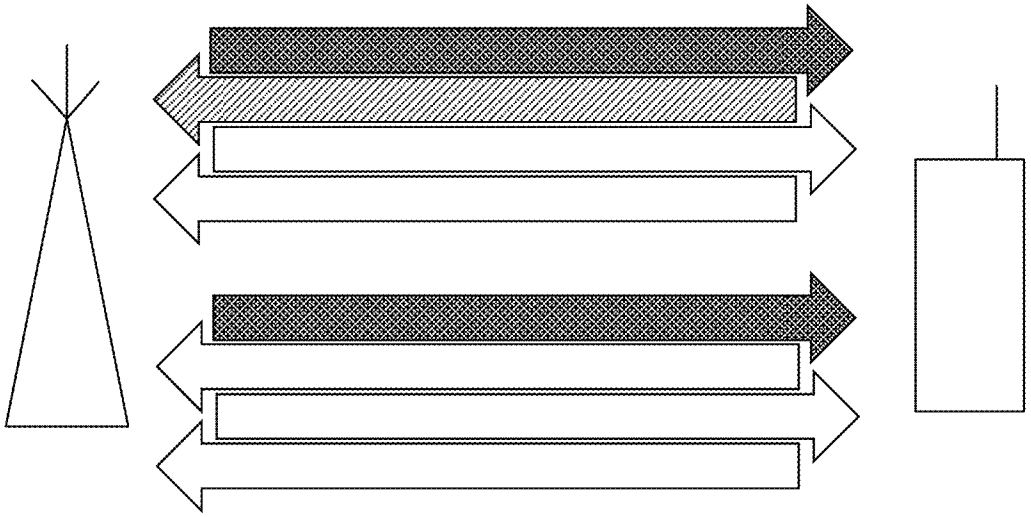
Figure 5C:
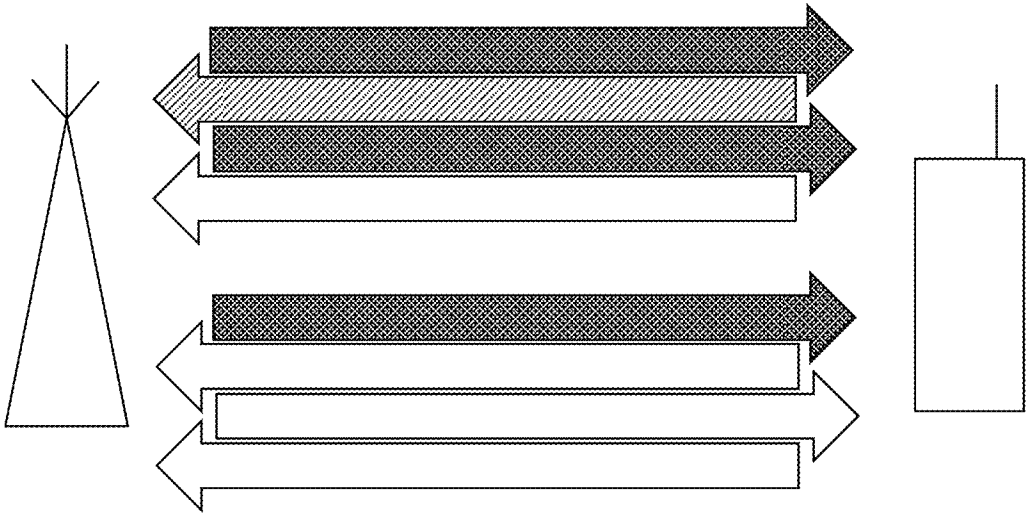
Figure 5D:
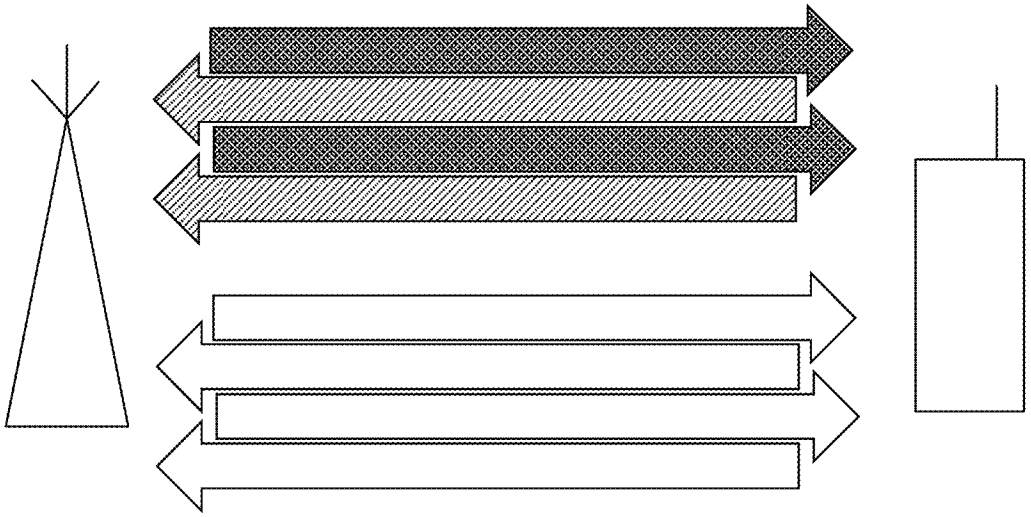
Figure 6A:
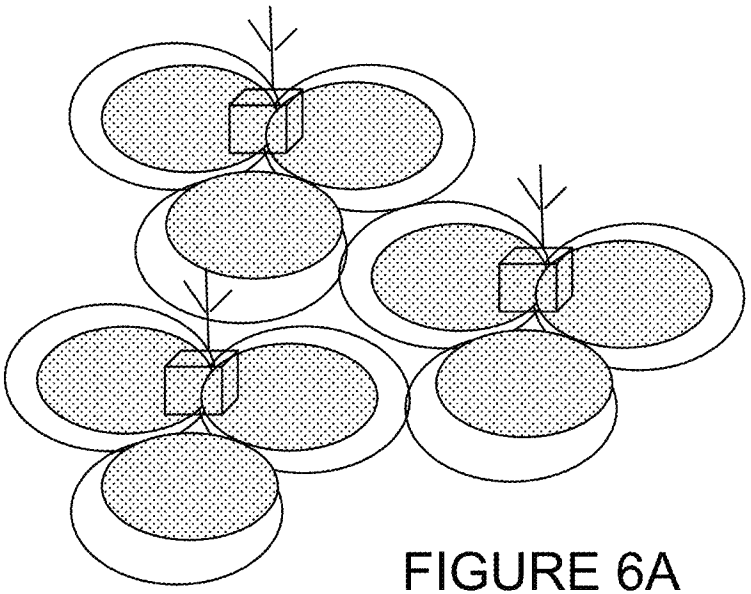
FIG. 6A-6B illustrate example carrier aggregation deployment scenarios.
Figure 6B:
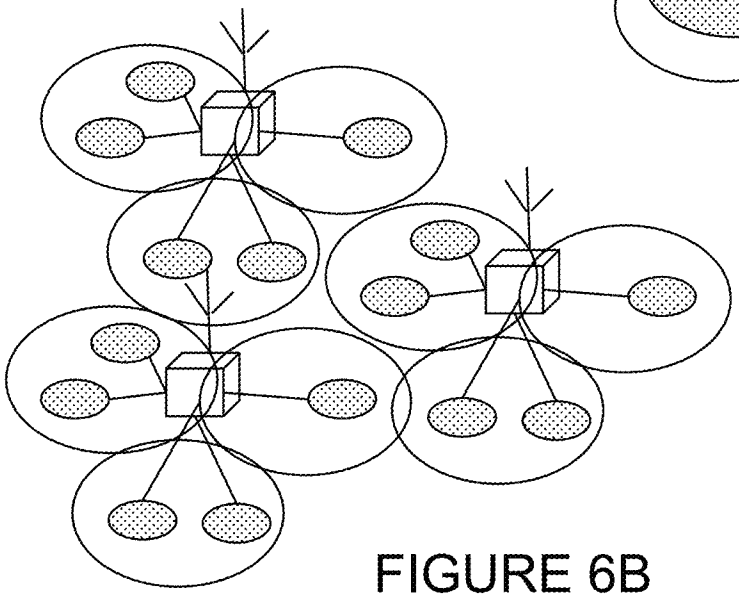
Figure 7:
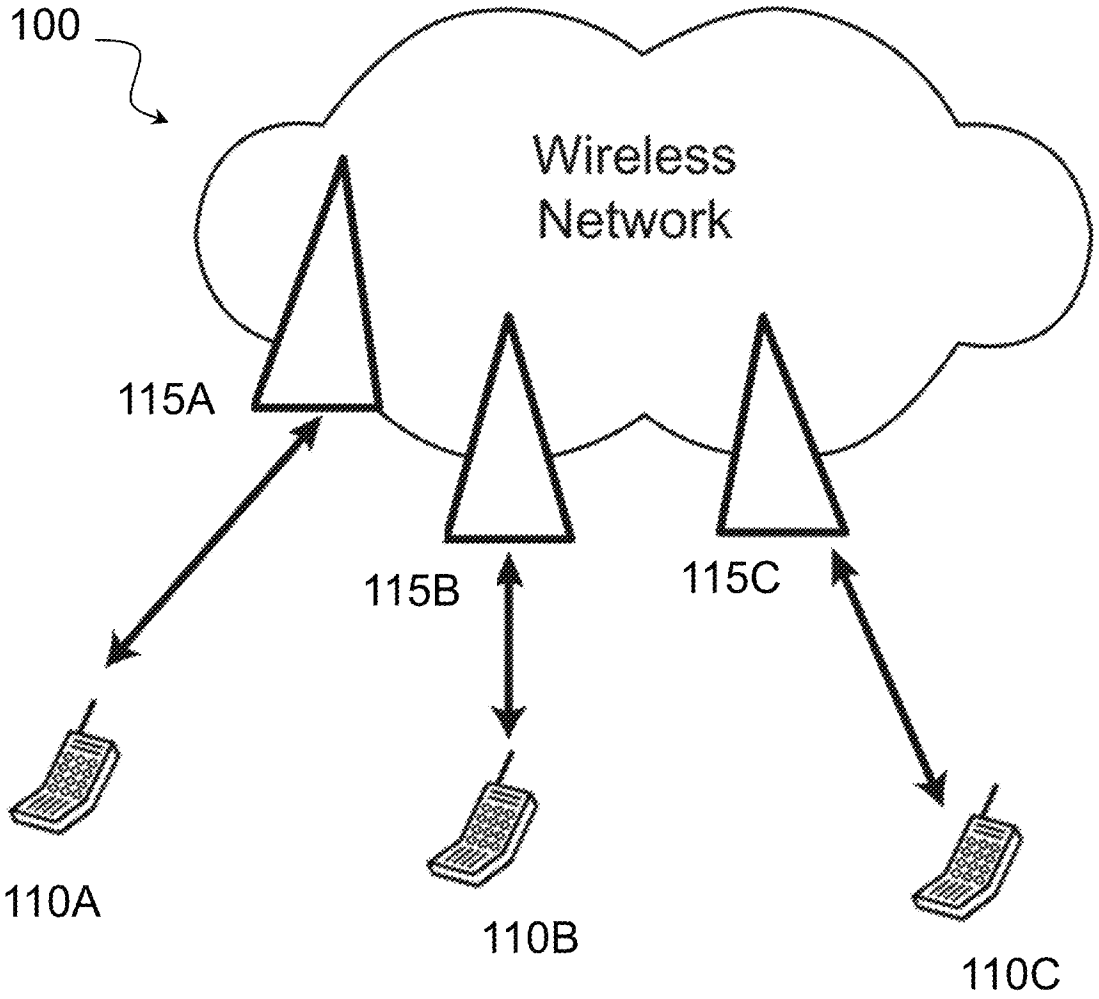
FIG. 7 illustrates an example network for deriving configured output power with different TTI patterns for carrier aggregation, according to certain embodiments.

FIG. 7 is a block diagram illustrating an embodiment of a network 100 for deriving maximum output power for different time resources, according to certain embodiments. In a particular embodiment, the with different time resources may include different transmission time index (TTI) patterns.

Network 100 includes one or more wireless devices 110A-C, which may be interchangeably referred to as wireless devices 110 or TTIs 110, and network nodes 115A-C, which may be interchangeably referred to as network nodes 115 or eNodeBs 115. A wireless device 110 may communicate with network nodes 115 over a wireless interface. For example, wireless device 110A may transmit wireless signals to one or more of network nodes 115, and/or receive wireless signals from one or more of network nodes 115. The wireless signals may contain voice traffic, data traffic, control signals, and/or any other suitable information. In some embodiments, an area of wireless signal coverage associated with a network node 115 may be referred to as a cell. In some embodiments, wireless devices 110 may have D2D capability. Thus, wireless devices 110 may be able to receive signals from and/or transmit signals directly to another wireless device 110. For example, wireless device 110A may be able to receive signals from and for transmit signals to wireless device 110B.

In certain embodiments, network nodes 115 may interface with a radio network controller (not depicted in FIG. 7). The radio network controller may control network nodes 115 and may provide certain radio resource management functions, mobility management functions, and/or other suitable functions. In certain embodiments, the functions of the radio network controller may be included in network node 115. The radio network controller may interface with a core network node. In certain embodiments, the radio network controller may interface with the core network node via an interconnecting network. The interconnecting network may refer to any interconnecting system capable of transmitting audio, video, signals, data, messages, or any combination of the preceding. The interconnecting network may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, the core network node may manage the establishment of communication sessions and various other functionalities for wireless devices 110. Wireless devices 110 may exchange certain signals with the core network node using the non-access stratum layer. In non-access stratum signaling, signals between wireless devices 110 and the core network node may be transparently passed through the radio access network. In certain embodiments, network nodes 115 may interface with one or more network nodes over an internode interface. For example, network nodes 115A and 115B may interface over an X2 interface.

As described above, example embodiments of network 100 may include one or more wireless devices 110, and one or more different types of network nodes capable of communicating (directly or indirectly) with wireless devices 110. Wireless device 110 may refer to any type of wireless device communicating with a node and/or with another wireless device in a cellular or mobile communication system. Examples of wireless device 110 include a mobile phone, a smart phone, a PDA (Personal Digital Assistant), a portable computer (e.g., laptop, tablet), a sensor, a modem, a machine-type-communication (MTC) device machine-to-machine (M2M) device, laptop embedded equipment (LEE), laptop mounted equipment (LME), USB dongles, a D2D capable device, or another device that can provide wireless communication. A wireless device 110 may also be referred to as UE, a station (STA), a device, or a terminal in some embodiments. Also, in some embodiments, generic terminology, "radio network node" (or simply "network node") is used. It can be any kind of network node, which may comprise a Node B, base station (BS), multi-standard radio (MSR) radio node such as MSR BS, eNode B, network controller, radio network controller (RNC), base station controller (BSC), relay donor node controlling relay, base transceiver station (BTS), access point (AP), transmission points, transmission nodes, RRU, RRH, nodes in distributed antenna system (DAS), core network node (e.g. MSC, MME etc.), O&M, OSS, SON, positioning node (e.g. E-SMLC), MDT, or any suitable network node. Example embodiments of wireless devices 110 and network nodes 115 are described in more detail with respect to FIGS. 10 and 17, respectively.

Although FIG. 7 illustrates a particular arrangement of network 100, the present disclosure contemplates that the various embodiments described herein may be applied to a variety of networks having any suitable configuration. For example, network 100 may include any suitable number of wireless devices 110 and network nodes 115, as well as any additional elements suitable to support communication between wireless devices or between a wireless device and another communication device (such as a landline telephone). Furthermore, although certain embodiments may be described as implemented in a long term evolution (LTE) network, the embodiments may be implemented in any appropriate type of telecommunication system supporting any suitable communication standards and using any suitable components, and are applicable to any radio access technology (RAT) or multi-RAT systems in which the wireless device receives and/or transmits signals (e.g., data). For example, the various embodiments described herein may be applicable to LTE, LTE-Advanced, LTE-U, UMTS, HSPA, GSM, cdma2000, WiMax, WiFi, another suitable radio access technology, or any suitable combination of one or more radio access technologies. Although certain embodiments may be described in the context of wireless transmissions in the downlink, the present disclosure contemplates that the various embodiments are equally applicable in the uplink and vice versa. Likewise, the techniques for deriving configured output power with different TTI patterns described herein are applicable to both. LAA LTE and standalone LTE operation in license-exempt channels and are generally applicable for transmissions from both network nodes 115 and wireless devices 110.

As described herein, the terms first node and a second node may be used to refer to two nodes which are either transmitting or receiving in unlicensed spectrum (or a shared spectrum where more than one system operates based on some kind of sharing regulations). Any of the above mentioned nodes may be referred to as "the first node" and/or "the second node."

A component carrier (CC) also interchangeably called as carrier, PCC or SCC is configured at the wireless device by the network node using higher layer signaling. For example, a CC may be configured by sending a RRC configuration message to the wireless device. The configured CC may be used by the network node for serving the wireless device on the serving cell (e.g. on PCell, SCell etc) of the configured CC. The configured CC is also used by the wireless device for performing one or more radio measurements (e.g. RSRP, RSRQ etc) on the cells operating on the CC e.g. PCell, SCell or PSCell and neighboring cells.

The term fallback mode refers herein to a carrier aggregation (CA) configuration which contains fewer CCs than the maximum number of CCs in a CA combination supported by the wireless device 110. For example a wireless device 110 supporting a CA combination with a maximum CA configuration of 4 DL CCs and 1 UL CC may support the following 3 fallback modes: 3 DL CCs and 1 UL CC, 1 DL CCs and 1 UL CC and DL CC and 1 UL CC (i.e. single carrier operation). The term fallback mode is also interchangeably called as lower order CA combination, lower order CA configuration, fallback CA mode, fallback CA configuration mode, fallback CA combination etc.

The term signal used herein can be any physical signal or physical channel. Examples of physical signals are reference signal such as PSS, SSS, CRS, PRS etc. The term physical channel (e.g., in the context of channel reception) used herein is also called as channel. Examples of physical channels are MIB, PBCH, NPBCH, PDCCH, PDSCH, sPUCCH, sPDSCH, sPUCCH, sPUSCH, MPDCCH, NPDCCH, NPDSCH, E-PDCCH, PUSCH, PUCCH, NPUSCH, etc.

The term time resource used herein may correspond to any type of physical resource or radio resource expressed in terms of length of time. Examples of time resources are: symbol, time slot, subframe, radio frame, TTI, interleaving time, etc.

The term TTI used herein may correspond to any time period (T0) over which a physical channel can be encoded and interleaved for transmission. The physical channel is decoded by the receiver over the same time period (T0) over which it was encoded. The TTI may also interchangeably called as short TTI (sTTI), transmission time, transmission time interval, slot, sub-slot, mini-slot, short subframe (SSF), mini-subframe etc.

The term Pcmax used herein may correspond to any parameter defining UE maximum output power. In some embodiments Pcmax is denoted by P1. The parameter may be pre-defined or configured. The parameter may be equal to or less than the nominal output power of the UE. Pcmax is also interchangeably called herein as UE maximum transmit power, UE maximum configured power, UE maximum operating power etc.

The term requirements used herein may comprise any type of is device requirements related to wireless device measurements aka radio requirements, measurement requirements, RRM requirements, mobility requirements, positioning measurement requirements etc. Examples of wireless device requirements related to wireless device measurements are measurement time, measurement reporting time or delay, measurement accuracy (e.g. RSRP/RSRQ accuracy), number of cells to be measured over the measurement time etc. Examples of measurement time are L1 measurement period, cell identification time or cell search delay, CGI acquisition delay etc.

In certain embodiments, a wireless device 110 may be configured with different time resources such as different TTI lengths or patterns. In one example scenario, wireless device 110 may be configured with at least two serving cells (e.g. PCell, SCell, etc.) a.k.a. carrier aggregation or multi-carrier operation. Wireless device 110 may be capable of at least two different TTIs (e.g. TTI of 1 ms and TTI of 2-OS etc). Wireless device 110 can be configured with any one of the plurality of TTIs supported by the wireless device 110 in different serving cells. For example, wireless device 110 may be configured with TTI=1 for operation on both PCell and SCell or TTI=2-OS for operation on both PCell and SCell.

In certain embodiments, wireless device 110 may also be configured with different TTIs in different serving cells. For example, wireless device 110 may be configured with TTI=1 and TTI=7-OS for operation on PCell and SCell, respectively.

In certain embodiments, wireless device 110 may further be capable of supporting operation whereby the TTI is changed over time in one or more serving cells of the wireless device 110. Additionally or alternatively, wireless device 110 may further be capable of supporting operation using different TTI in uplink and downlink of any one or more of its serving cells. An example of the basic scenario is described in Table 1:

| Cases | Carder combinations | Example with two carriers, however not limited to two carriers) |
|---|---|---|
| Same TTI pattern is used in different UL carriers | More than one UL carriers in the aggregation | A cell Cell1 operating in frequency F1 uses a 1$^{st}$ TTI pattern in UL, while a cell Cell2 operating in frequency F2 uses the same TTI pattern in UL. A wireless device aggregates Cell1 and Cell2 in one UL CA configuration. |
| Different TTI patterns are used in UL different carriers | More than one UL carriers in the aggregation | A cell Cell1 operating in frequency F1 uses a 1$^{st}$ TTI pattern in UL, while a cell Cell2 operating in frequency F2 uses a 2$^{nd}$ TTI pattern in UL. A wireless device aggregates Cell1 and Cell2 in one UL CA configuration. |

Figure 8A:
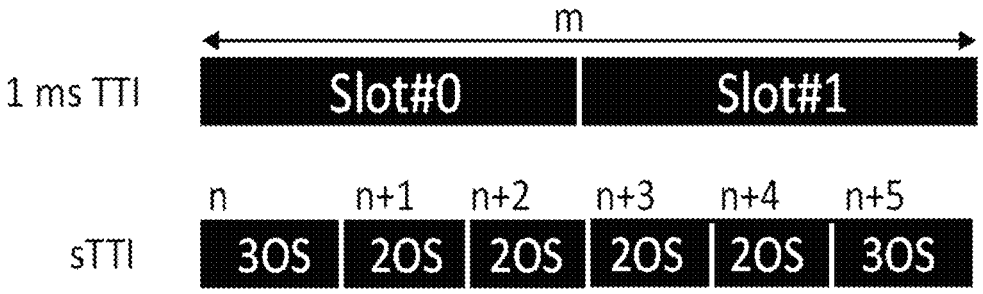
FIGS. 8A-8C illustrate example TTI structures in carrier aggregation.
Figure 8B:
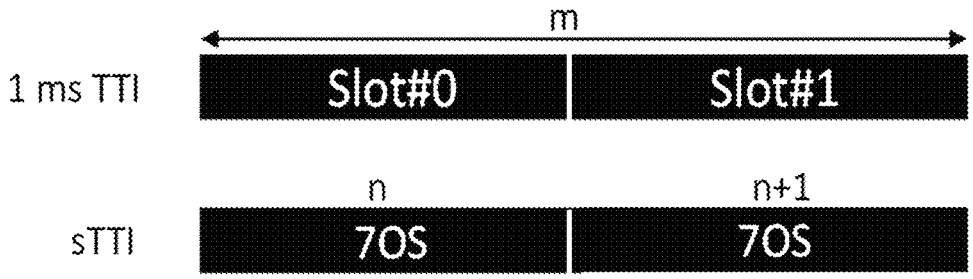
Figure 8C:
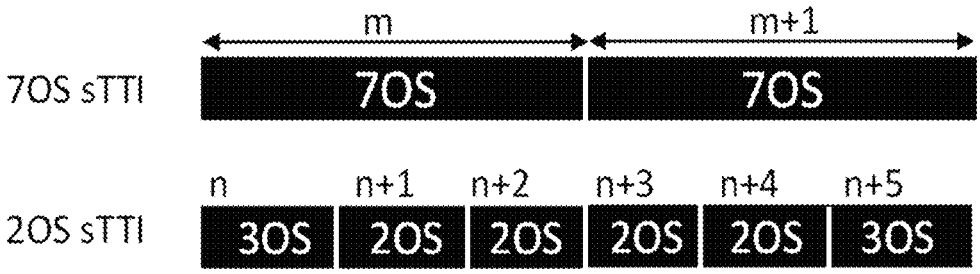

FIGS. 8A-8C illustrate examples of different TTI patterns in different uplink carriers in an uplink carrier aggregation network, according to certain embodiments. A currently used TTI length consists of 14 OFDM symbols. In case of shortened TTI, the TTI length may be reduced to a defined number less than 14, for example, 2-OFDM symbols, or 7-OFDM symbols. These examples are denoted as: 2-OS sTT1, and 7-OS sTTI, respectively.

Different TTI lengths can be configured in different directions, i.e. different TTI lengths between downlink and uplink, or the TTI lengths may be the same in uplink and downlink. The different TTI lengths may be different shortened TTI lengths or may be a current TTI length (14 symbols) and a shortened TTI length. For example, the downlink and uplink TTI lengths {DL;UL} may be {2,2}, {7,7} or {2,7}.

FIGS. 8A-8C illustrate examples of different TTI lengths on component carriers (CC1,CC2) of a carrier aggregation transmission. In FIG. 8A, CC1 has a TTI of 1 ms, which is divided into two slots #0 and #1, and CC2 has a sTTI of 2-OFDM symbols and 3-OFDM symbols. In FIG. 8B, CC1 has a TTI of 1 ms, which is divided into two slots #0 and #1, and CC2 has a sill of 7-OFDM symbols. In FIG. 8C, CC1 has a sTTI of 7-OFDM symbols, and CC2 has a sTTI of 2-OFDM symbols and 3-OFDM symbols.

For uplink CA, the UL carriers may have the same length within the same PUCCH group. Alternatively, different sTTI lengths can be configured in different PUCCH groups. Different combinations are considered below.

Figure 9:
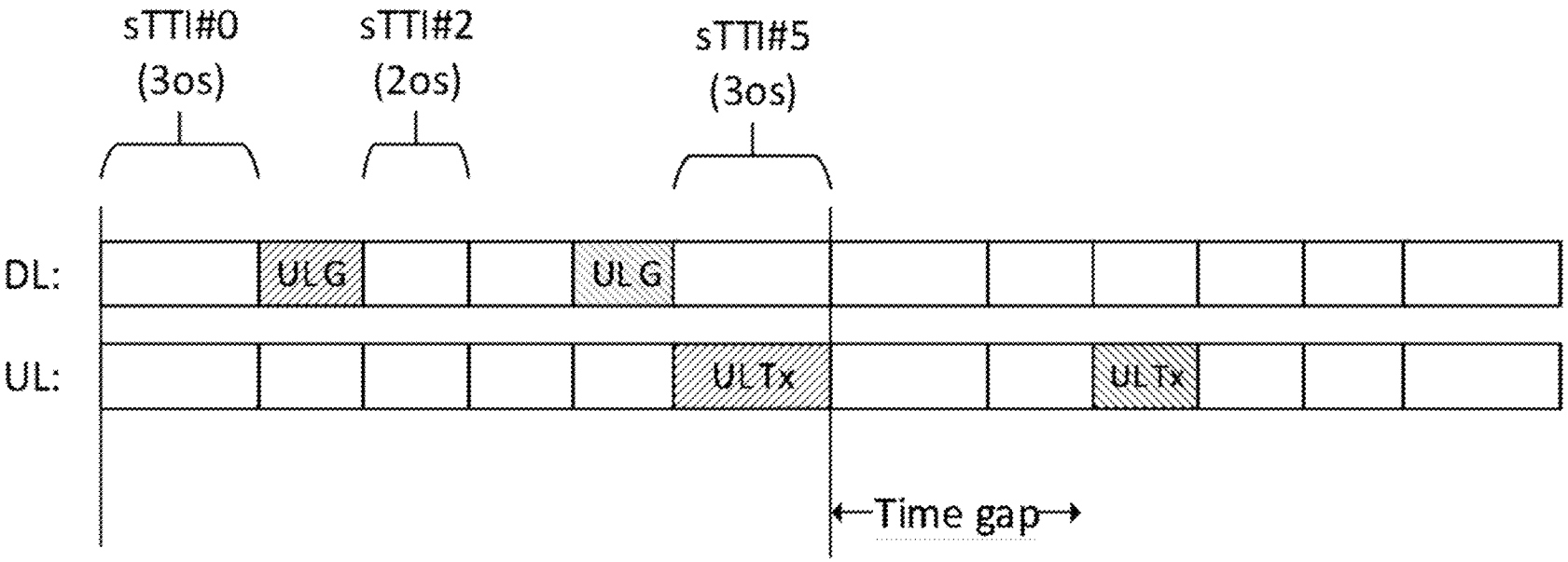
FIG. 9 illustrates example scheduling involving uplink and downlink.

FIG. 9 illustrates an example of uplink grant to uplink transmission timing, according to certain embodiments. An UL grant (UL G) sent in the DL will grant an UL transmission (UL Tx). Since both the decoding of the UL grant in FIG. 9, and the preparation of the UL transmission will take some time, the UL transmission is specified to take place after a specified time duration. As an example for LTE and 2-OS sTTI, it is assumed that this processing time is 3 sTTI periods (also known as N+4 timing). In some cases, the processing time can alternatively be 5 sTTT periods (also known as N+6 timing). A time gap between UL Tx may be set as 2 sTTIs. If the second UL transmission would not be scheduled, there is no reason for the UE to keep RF components and PA ON to keep phase reference.

Figure 10:
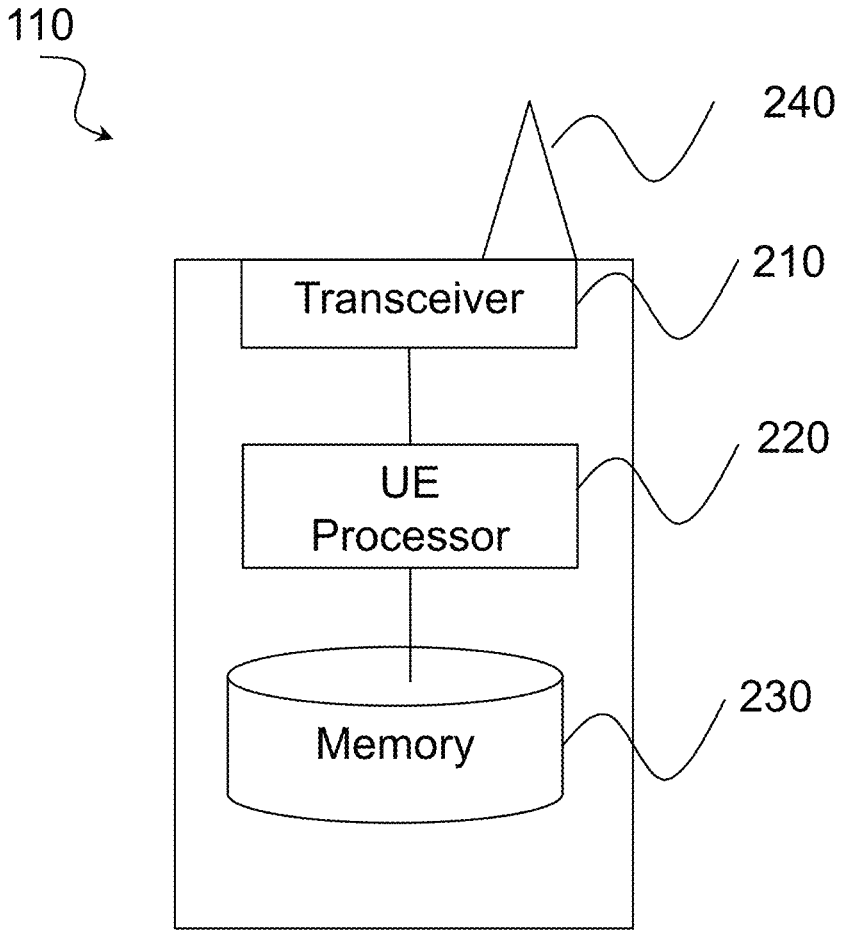
FIG. 10 illustrates an example wireless device for deriving maximum output power, according to certain embodiments.

FIG. 10 illustrates an example wireless device 110 for deriving maximum output power for different time resources such as different TTI lengths or patterns in carrier aggregation, in accordance with certain embodiments. As depicted, wireless device 110 includes transceiver 210, processor 220, and memory 230. In some embodiments, transceiver 210 facilitates transmitting wireless signals to and receiving wireless signals from network node 115 (e.g., via an antenna), processor 220 executes instructions to provide some or all of the functionality described above as being provided by wireless device 110, and memory 230 stores the instructions executed by processor 220. Examples of a wireless device 110 are provided above.

Processor 220 may include any suitable combination of hardware and software implemented in one or more modules to execute instructions and manipulate data to perform some or all of the described functions of wireless device 110. In some embodiments, processor 220 may include, for example, one or more computers, one or more central processing units (CPUs), one or more microprocessors, one or more applications, processing circuitry, and/or other logic.

Memory 230 is generally operable to store instructions, such as a computer program, software, an application including one or more of logic, rules, algorithms, code, tables, etc. and/or other instructions capable of being executed by a processor. Examples of memory 230 include computer memory (for example, Random Access Memory (RAM) or Read Only Memory (ROM)), mass storage media, (for example, a hard disk), removable storage media (for example, a Compact Disk (CD) or a Digital Video Disk (DVD)), and/or or any other volatile or non-volatile, non-transitory computer-readable and/or computer-executable memory devices that store information.

Other embodiments of wireless device 110 may include additional components beyond those shown in FIG. 10 that may be responsible for providing certain aspects of the wireless device's functionality, including any of the functionality described herein and/or any additional functionality (including any functionality necessary to support the solution described above).

Figure 11:
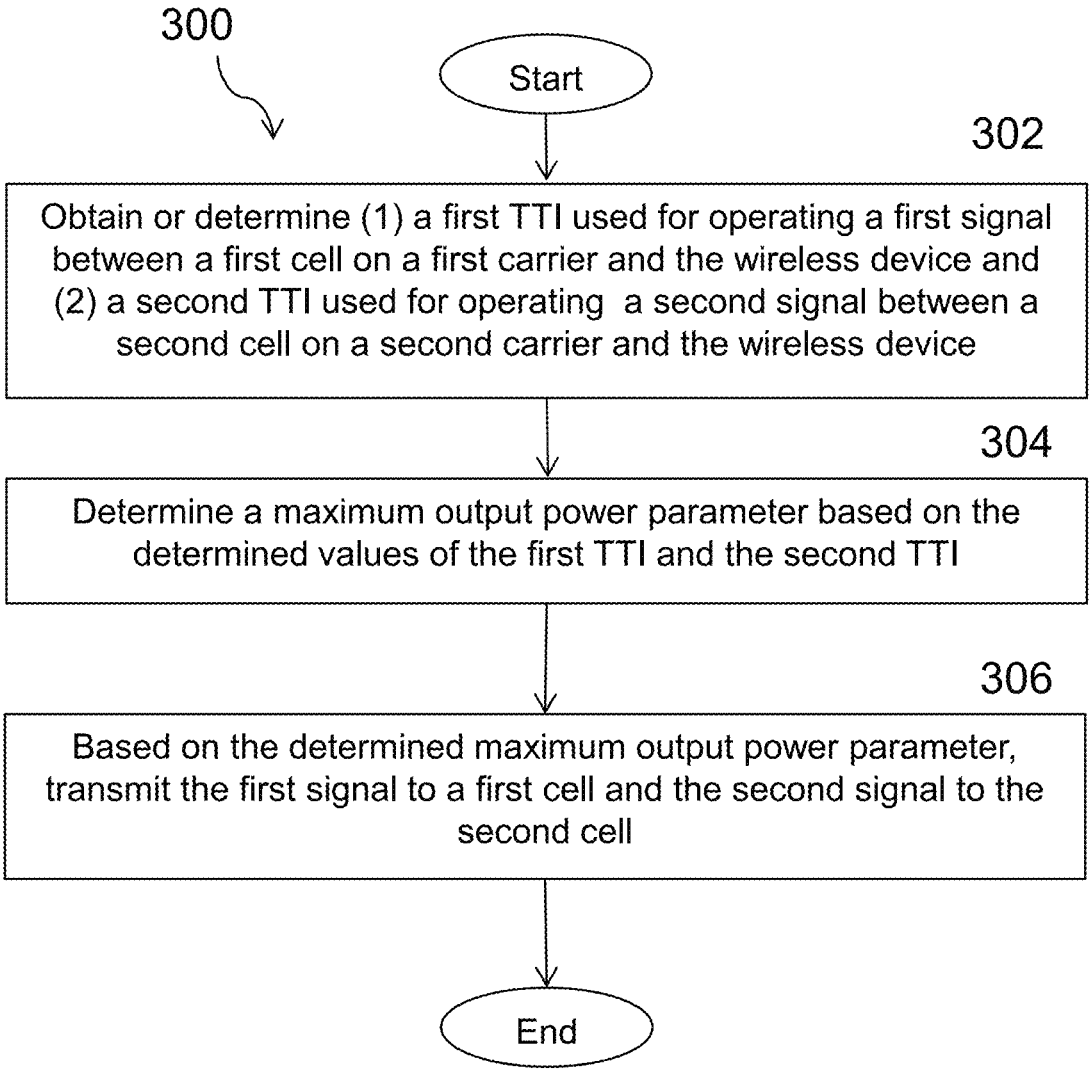
FIG. 11 illustrates an example method by a wireless device for deriving maximum output power, according to certain embodiments.

FIG. 11 illustrates an exemplary method 300 by wireless device 110 for deriving maximum output power, according to certain embodiments. The method begins at step 302, when wireless device 110 obtains or determines a first TTI used for operating a first signal (S1) between a first cell on a first carrier and wireless device 110 and a second TTI used for operating a second signal (S2) between a second cell on as second carrier and wireless device 110. In certain embodiments, the configuration of the first TTI may be performed by receiving a message from network node 115. In a particular embodiment, for example, the message may include an RRC message.

The first cell can be a serving cell of the wireless device 110. Examples of serving cells are PCell, PSCell, and other cells. The serving cell can be activated or deactivated. Where the first cell corresponds to the uplink (UL) serving cell, the first TTI corresponds to the TTI of the UL serving cell.

The term operating signals, also referred to as the first signal (S1), between the first cell and wireless device 110 herein may comprise of reception of signals (S11) by the UE from the first cell and/or transmission of signals (S12) by wireless device 110 to the first cell. Examples of S11 when receiving signals from the first cell at wireless device 110 are DL channels such as PDCCH, PDSCH, sPDCCH, sPDSCH etc. Examples of S12 when transmitting signals by wireless device 110 to the first cell are UL channels such as PUCCH, PUSCH, sPUCCH, sPUSCH, and other suitable UL channels.

In certain embodiments, wireless device 110 may determine the first TTI based on one, or more of the following principles:

- a Predefined information such as, for example, relation between the first TTI and a first frequency band.
- Configuration received from network node 115. For example the UE may determine the TTI pattern used in any time instance 111 any carrier by receiving control signals in DL or by receiving RRC message.
- Pre-defined rule. Examples of rules are:
  - Apply the same TTI as used in a reference cell. The reference cell may include the PCell, PSCell, or another suitable reference cell.
  - Based on TTI used in the opposite direction of first cell. For example,
    - Assume same TTI in UL and DL cell.
    - Assume UL cell1 uses TTI which is not shorter than the TTI of the DL cell1
- Autonomous determination such as, for example, by blind detection by wireless device 110 by attempting to decode DL channel of different pre-define TTIs.

Wireless device 110 also obtains or determine a second TTI used for operating a second signal between a second cell on a second carrier and the wireless device 110 at step 302. The second cell can be a serving cell of wireless device 110. Again, examples of serving cells are PCell, SCell, PSCell, etc. The serving cell can be activated or deactivated. Where for example, the first cell corresponds to the UL serving cell, the second TTI may correspond to the TTI of the serving cell.

The operating signals between the second cell and the wireless device 110 may include the reception of signals (S21) by wireless device 110 from the second cell and/or transmission of signals (S22) by wireless device 110 to the second cell. Examples of S21 when receiving signals from the first cell at wireless device 110 are DL channels such as PDCCH, PDSCH, PDCCH, sPDSCH etc. Examples of S22 when transmitting signals by wireless device 110 to the first coil are UL channels such as PUCCH, PUSCH, sPUCCH, sPUSCH, and other suitable UL channels.

In certain embodiments, wireless device 110 may determine the second TTI based on one or more of the mechanisms described above for obtaining or determining the first TTI for operation in the first cell. In certain embodiments, wireless device may use the same principles as described above for determining the TI of any number of cells, including a third cell, a fourth cell, and so on. Thus, various embodiments are applicable to when wireless device 110 is configured with any number of TTIs for operating any number of serving cells.

At step 304, wireless device 110 determines a maximum output power parameter (P1) based on determined values of the first TTI and the second TTI. The estimation of P1 may be done over a window or duration (Tw) which depends on at least the first TTI and second TTI used by wireless device 110 for at least transmitting signals in its serving cells (first cell and second cell), respectively. The parameter Tw may also be referred to as reference time, reference TTI length or window, TTI reference (TTIref), Pcmax reference time, estimation period of max power etc.

More specifically, the value Tw used for calculating or estimating P1 is a function of the first TTI1 and the second TTI2 used by wireless device 110 in the UL of the first cell and the UL of the second cell respectively. This may be expressed by the following expression:

$$Tw=f(TTI1,TTI2)$$

Where $P1=f1(Tw)$

In an example, the function of TTI1 and TTI2 selects one of the length of TTI1 or TTI2, e.g. the longer one. As a farther example embodiment the value of Tw is chosen as a fraction of TTI1 and/or TTI2. For example, the value Tw is chosen as half of the longest TTI duration of TTI1 or TTI2. Alternatively, the value Tw is chosen to be another fraction of TTI1 and/or TTI2. The value of Tw may be based on the longer of TTI1 and TTI2 or based on another criteria using one or both of TTI1 and/or TTI2 (or any other TTI). In some aspects, the value of Tw is configured as the whole value of the length of TTI1 and/or TTI2. In some examples, the value of Tw may be determined to be 7 OFDM symbols or another predetermined value, e.g. if a largest length of TTI is equal to or larger than 7 OFDM symbols or the predetermined value. The above examples are applicable to any number of TTI, and may be considered as generally applying to a plurality of TTI lengths. The function determining Tw may determine a length different to either TTI1 or TTI2. Information indicating a value of Tw, or a parameter or information arranged for generating Tw, may be determined by the wireless device, or signalled to the wireless device from the network node, or the value of Tw may be determined by the wireless device based on a pre-determined value or derived from some other signal or configuration of the wireless device.

In certain other embodiments, the value of Tw may depend on: TTI used in UL (TTI1u) and TTI used in DL (TTI1d) in the first cell, TTI used in UL (TTI2u) in the second cell and TTI used in DL (TTI2d) in the second cell by the wireless device. For example, Tw may be expressed using the following function:

$$Tw=f2(TTI1u,TTI1d,TTI2u,TTI2d)$$

The above principles or rules may apply to any number of serving cells configured for wireless device 110. The value of Tw of any example may be configured as a whole length or a selected fraction of the length of a defined one TTI or combination of the TTI, for example as described above.

For each determined sets of TTIs for all its configured serving cells, the wireless device 110 may determine $P_{CMAX_L,c}$ and $P_{CMAx,c}$ values. Several examples are provided below.

One example of a general function for determining the maximum output power can be expressed by Equation 4

$$(P_{CMAX},P_{CMAX_L})=f(TTI1,TTI2) \quad \text{(Equation 4)}$$

In Equation 4, first TTI (TTI1) and second TTI (TTI2) are the TTI used in the UL of the first cell (cell1) and UL of the second cell (cell2), respectively. As an example embodiment, the value of ($P_{CMAX}$, $P_{CMAX_L}$) can be estimated over a time window (Tw) as a fraction of TTI1 and/or TTI2, for example, half of the longest applicable TTI duration. The time window used may be determined by any criteria or function, e.g. based on one or more TTI length.

Specific examples of such functions are given in the following descriptions. Such function would first determine the length on which UE should evaluate the maximum output power to be used for transmitting signal.

If both TTIs have the same length (TT1=TT2), an obvious choice would be to select that TTI as timing reference ($TTI_{REF}$).

If TTIs have different value, one example would be to consider the lowest common multiple of both values, as shown in Table 3:

TABLE 3

Selection of $TTI_{REF}$ (TTI reference)

| TTI 1 | TTI2 | $TTI_{REF}$ |
|---|---|---|
| 2 OS | 4 OS | 4 OS |
| 2 OS | 7 OS | 7 OS(*) |
| 4 OS | 2 OS | 4 OS |
| 4 OS | 7 OS | 7 OS(*) |
| 7 OS | 2 OS | 7 OS(*) |
| 7 OS | 4 OS | 7 OS(*) |
| 1 ms | 2 OS | 7 OS(**) |

Note that even if shortened TTI is specified to be 4OS, it would vary from 3 to 4 OS to always be slot and sub-frame aligned. In a similar way, a 2 OS TTI would vary from 2 to 3 OS.

(**)Note that an example may be a determination of $TTI_{REF}$ which is different to any TTI length used, i.e, TTI1 and TTI2.

In some examples, the evaluation window ($TTI_{REF}$) is based on the plurality of TTIs, e.g. by selecting the length of the highest length TTI. Alternatively, the $TTI_{REF}$ may be a fraction (e.g. half) of one of the TTI lengths (e.g. the highest length TTI). In some examples, the $TTI_{REF}$ is different to any of the TTI lengths used, e.g. a predetermined value, optionally selected according to one or more TTI length used. In some examples, the $TTI_{REF}$ is a slot (i.e. 7 OFDM symbols).

Once this $TTI_{REF}$ has been determined, existing requirements specified in TS36.101 section 6.2.5A would apply to determine UE maximum output power but instead of evaluating power each subframe, it may be done every $TTI_{REF}$, in certain embodiments.

Figure 12:
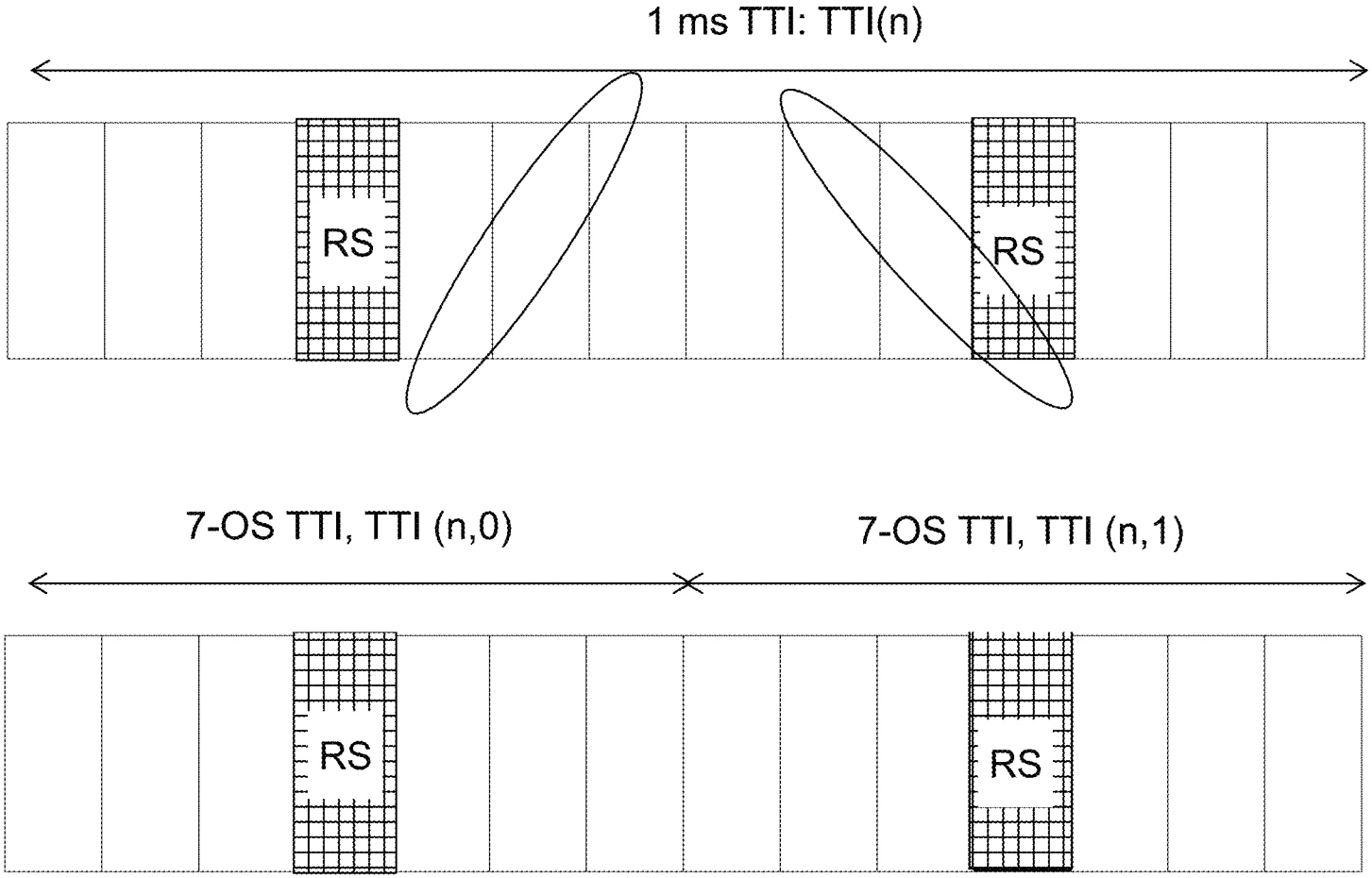
FIG. 12 illustrates an example when 14-OS and 7-OS TTIs are used in two cells which are involved in a carrier aggregation combination, according to certain embodiments.

FIG. 12 illustrates an example embodiment for PCMAX definitions when two different TTI patterns are used in any carrier aggregation combination. Specifically, FIG. 12 illustrates example PCMAX definitions when 14-OS and 7-OS patterns are used. The total configured maximum output power PCMAX may be set within the following bounds:

$$P_{CMAX_L} \le P_{CMAX} \le P_{CMAX_H}$$

Where $$P_{CMAX_L}=MIN\{P_{CMAX_L,1}(TTI(n)),P_{CMAX_L,2}(TTI(n,0)),P_{CMAX_L,2}(TTI(n,1)),P_{Powereclass}\}$$

$$P_{CMAX_H}=MIN\{P_{CMAX_H,1}(TTI(n)),P_{CMAX_H,2}(TTI(n,0)),P_{CMAX_H,2}(TTI(n,1)),P_{Powereclass}\}$$

In certain embodiments, the above mentioned $P_{CMAX}$ may be applied to the reference TTIs. For example, the above mentioned $P_{CMAX}$ may be applied to the TTI(n) in the first cell and TTI(n,0) and TTI(n,1) in the second cell. $P_{CMAX_L,a(b)}$ and $P_{CMAX_H,a(b)}$ are the $P_{CMAX,c}$ lower and higher limit respectively for cell a on TTI b.

In other embodiments, a slot based PCMAX for 14-OS TTI (1 ms TTI) may be used and compared with the shorter TTI, as shown in the FIG. 12.

Figure 13:
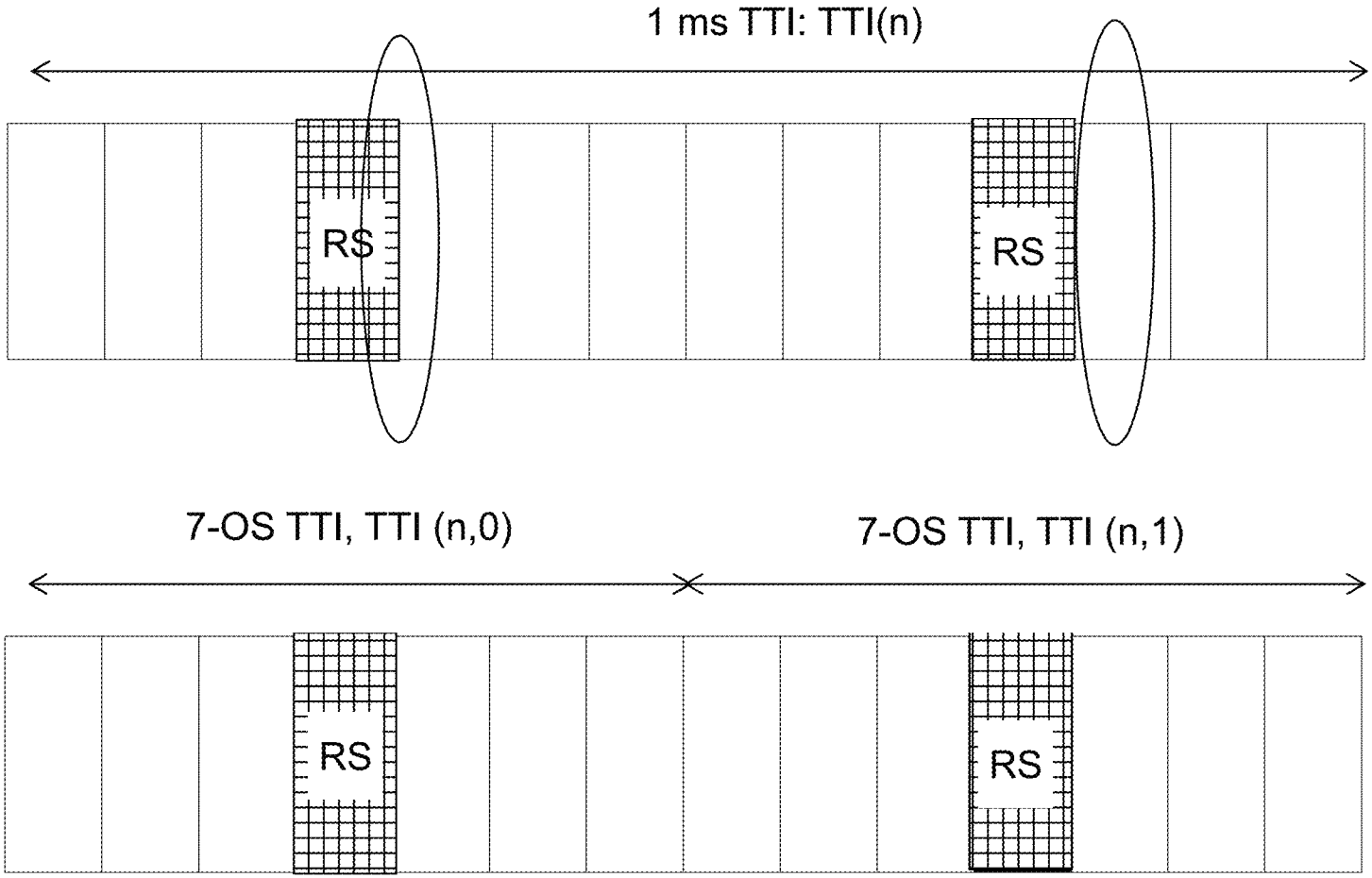
FIG. 13 illustrates example PCMAX definitions 14-OS and 7-OS TTIs are used in two cells which are involved in a carrier aggregation combination, according to certain embodiments.

FIG. 13 illustrates PCMAX definitions when two different TTI patterns are used in any carrier aggregation combination. Specifically, FIG. 13 depicts PCMAX definitions when 14-OS and 7-OS TTI patterns are used. The comparison on slot base is shown from legacy TTI pattern.

As depicted, $P_{CMAX_L}$ can be defined as:

$$P_{CMAX_L} = MIN\left\{\begin{matrix} MIN[P_{CMAX_L,1}(TTI(n, s1)), P_{CMAX_L,2}(TTI(n, 0))], \\ MIN[P_{CMAX_L,1}(TTI(n, s2)), P_{CMAX_L,2}(TTI(n, 1))], \\ P_{PowerClass} \end{matrix}\right\}$$

Similarly, $P_{CMAX_H}$ can be defined as:

$$P_{CMAX_H} = \mathrm{MIN}\left\{\begin{matrix} \mathrm{MIN}[P_{CMAX_H,1}(\mathrm{TTI}(n, s1)), P_{CMAX_H,2}(\mathrm{TTI}(n, 0))], \\ \mathrm{MIN}[P_{CMAX_H,1}(\mathrm{TTI}(n, s2)), P_{CMAX_H,2}(\mathrm{TTI}(n, 1))], \\ P_{PowerClass} \end{matrix}\right\}$$

In the both of the above equations, $P_{CMAX_L,a(b,c)}$ and $P_{CMAX_H,a(b,c)}$ denote lower and higher $P_{CMAX}$ for CG a in subframe b and slot c for the first cell.

Figure 14:
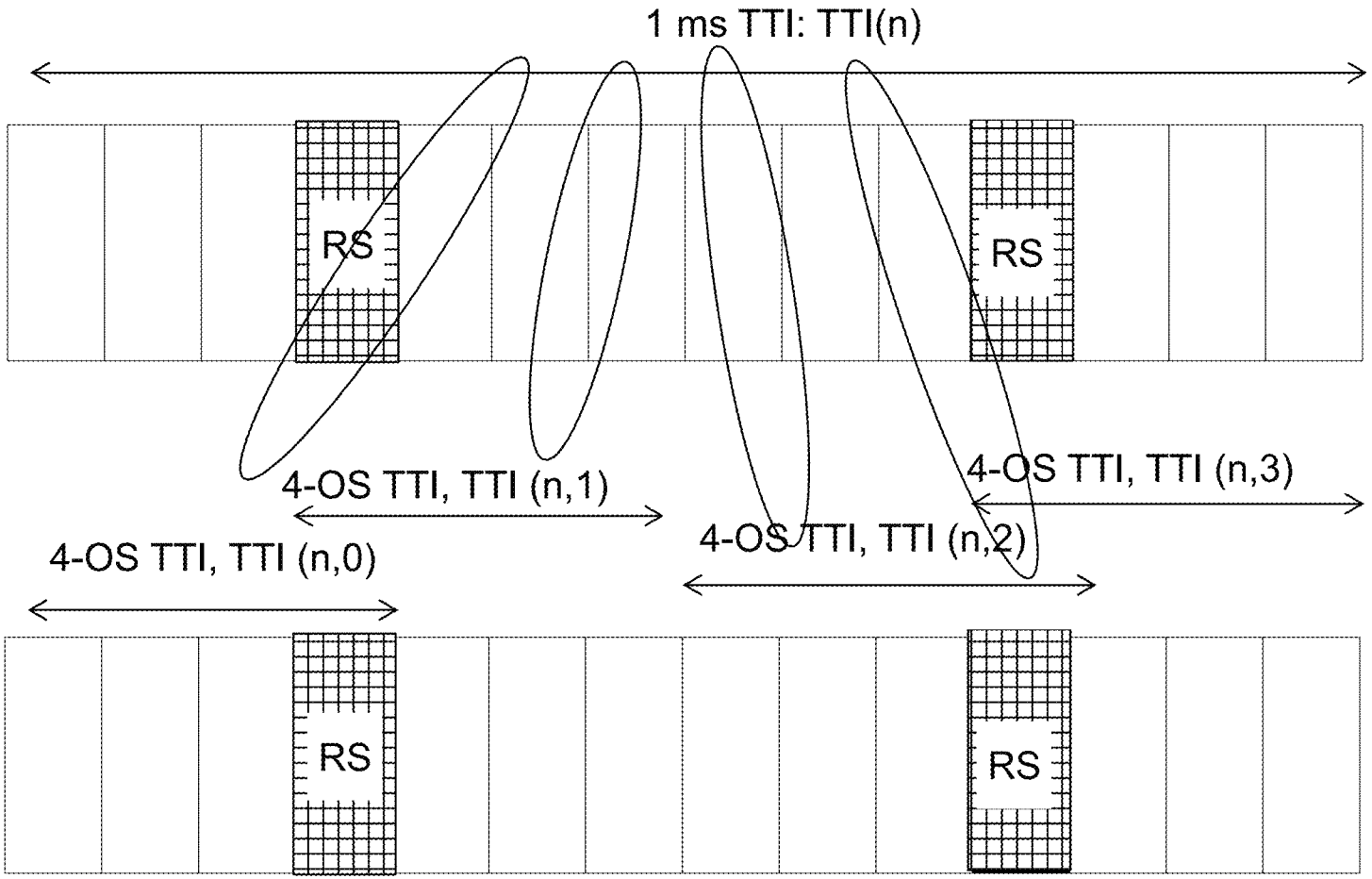
FIG. 14 illustrates example PCMAX definitions when 4-OS and 14-OS TTI patterns are used in two cells which are involved in a carrier aggregation combination, according to certain embodiments.

FIG. 14 illustrates PCMAX definitions when two different TTI patterns are used in any carrier aggregation combination. Specifically, PCMAX definitions are shown when 4-OS and 14-OS TTI patterns are used.

Following the same logic as shown in FIG. 12 and subsequent formulation of PCMAX definition, the following may be defined for the above mentioned example:

$$P_{CMAX_L} = \mathrm{MIN}\left\{\begin{matrix} P_{CMAX_L,1}(\mathrm{TTI}(n)), P_{CMAX_L,2}(\mathrm{TTI}(n, 0)), P_{CMAX_L,2}(\mathrm{TTI}(n, 1)), \\ P_{CMAX_L,2}(\mathrm{TTI}(n, 2)), P_{CMAX_L,2}(\mathrm{TTI}(n, 3)), P_{PowerClass} \end{matrix}\right\}$$

$$P_{CMAX_H} = \mathrm{MIN}\left\{\begin{matrix} P_{CMAX_H,1}(\mathrm{TTI}(n)), P_{CMAX_H,2}(\mathrm{TTI}(n, 0)), P_{CMAX_H,2}(\mathrm{TTI}(n, 1)), \\ P_{CMAX_H,2}(\mathrm{TTI}(n, 2)), P_{CMAX_H,2}(\mathrm{TTI}(n, 3)), P_{PowerClass} \end{matrix}\right\}$$

Figure 15:
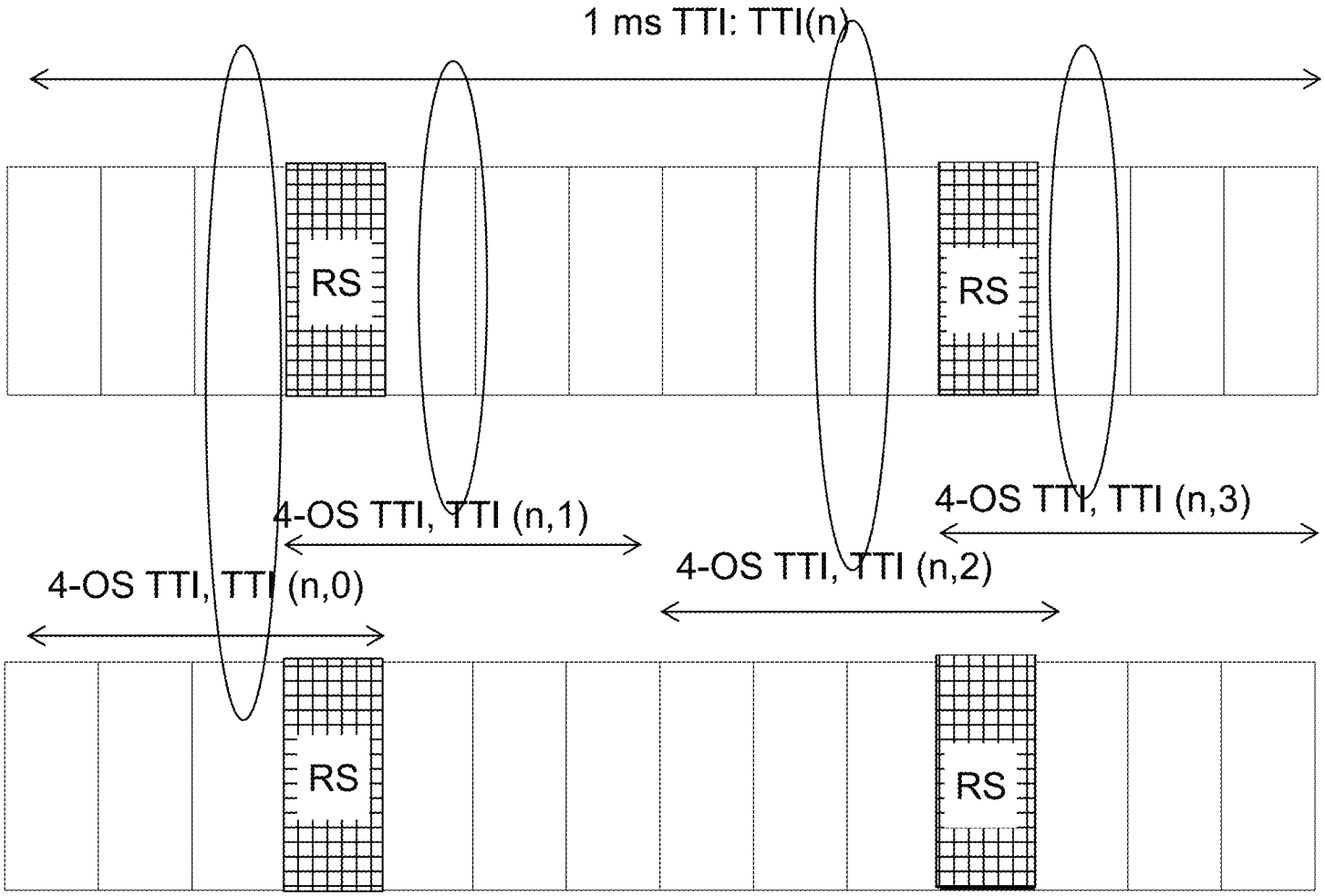
FIG. 15 illustrates example PCMAX definitions when 14-OS and 7-OS TTI patterns are used in a carrier aggregation combination as compared to slot base from legacy TTI pattern, according to certain embodiments.

Another alternative could be to use slot based PCMAX for 14-OS TTI (1 ms TTI) and compare that with the shorter TTI, as shown in FIG. 15, which illustrates $P_{CMAX}$ definitions when two different TTI patterns are used in any carrier aggregation combination. Specifically, PCMAX definitions are defined for 14-OS and 7-OS TTI patterns with comparison on slot-base from legacy TTI pattern.

As seen, $P_{CMAX_L}$ may be defined as:

$$P_{CMAX_L} = \mathrm{MIN}\left\{\begin{matrix} \mathrm{MIN}[P_{CMAX_L,1}(\mathrm{TTI}(n, s1)), P_{CMAX_L,2}(\mathrm{TTI}(n, 0))], \\ \mathrm{MIN}[P_{CMAX_L,1}(\mathrm{TTI}(n, s1)), P_{CMAX_L,2}(\mathrm{TTI}(n, 1))], \\ \mathrm{MIN}[P_{CMAX_L,1}(\mathrm{TTI}(n, s2)), P_{CMAX_L,2}(\mathrm{TTI}(n, 2))], \\ \mathrm{MIN}[P_{CMAX_L,1}(\mathrm{TTI}(n, s2)), P_{CMAX_L,2}(\mathrm{TTI}(n, 3))], \\ P_{PowerClass} \end{matrix}\right\}$$

Similarly, $P_{CMAX_H}$ can be defined as:

$$P_{CMAX_H} = \mathrm{MIN}\left\{\begin{matrix} \mathrm{MIN}[P_{CMAX_H,1}(\mathrm{TTI}(n, s1)), P_{CMAX_H,2}(\mathrm{TTI}(n, 0))], \\ \mathrm{MIN}[P_{CMAX_H,1}(\mathrm{TTI}(n, s1)), P_{CMAX_H,2}(\mathrm{TTI}(n, 1))], \\ \mathrm{MIN}[P_{CMAX_H,1}(\mathrm{TTI}(n, s2)), P_{CMAX_H,2}(\mathrm{TTI}(n, 2))], \\ \mathrm{MIN}[P_{CMAX_H,1}(\mathrm{TTI}(n, s2)), P_{CMAX_H,2}(\mathrm{TTI}(n, 3))], \\ P_{PowerClass} \end{matrix}\right\}$$

The above examples can also be expanded for other TTI combinations between carriers in any carrier aggregation operation.

In some examples, different windows (Tw) or reference times may be used for PCMAX evaluations, which are then compared. For example, $P_{CMAX}$, $P_{CMAX_L}$, and/or $P_{CMAX_H}$ evaluations may be based on TTI1 and TTI2 (or another reference TTI), and compared to determine a $P_{CMAX}$, $P_{CMAX_L}$, and/or $P_{CMAX_H}$ for use in determining the output power of the wireless device.

Figure 16:
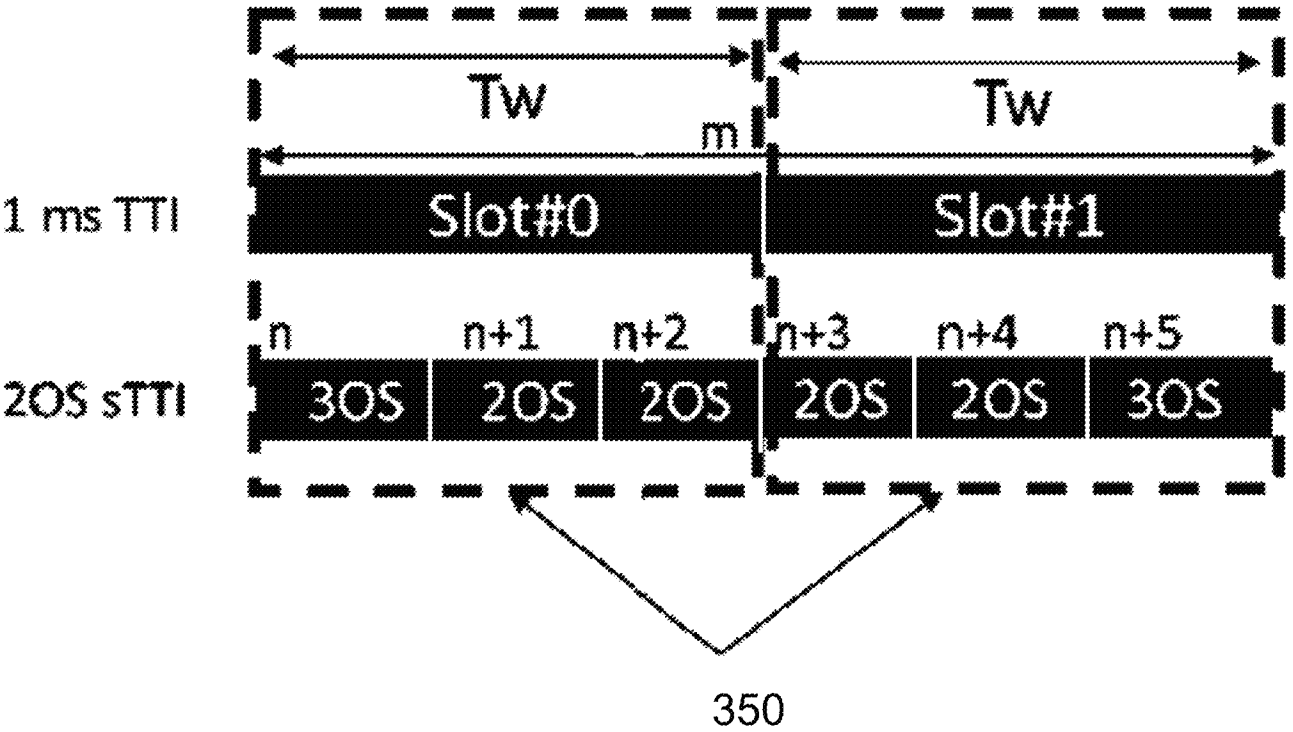
FIG. 16 illustrates using different TTI lengths.

FIG. 16 shows an example of two different TTI patterns being used in any carrier aggregation combination, in this case with a 14-OS (1 ms) pattern and a 2-OS sTTI pattern. A comparison may be based on group of sTTI in a slot 350 (7 OFDM symbols) as defined in a legacy TTI pattern. Therefore, in this example, two slots 350 are shown. In this example, the window (Tw) for the 1 ms TTI may be a slot 350.

The maximum output power parameters $P_{CMAX,PCMAX_L}$, and/or $P_{CMAX_H}$ may be calculated for different TTIs, optionally using different windows (Tw), and compared to determine the $P_{CMAX}$, $P_{CMAX_L}$, and/or $P_{CMAX_H}$ to be used. In some examples, the different TTIs are used on different carriers. The different TTIs (i.e. TTI instances) may be different lengths and/or consecutive TTIs of the same length. For example, a minimum one of the evaluated $P_{CMAX}$, $P_{CMAX}$_L, and/or $P_{CMAX_H}$ from a group of TTIs is selected. In this example, the group of TTIs are those TTIs which are at least partially present in a time period 350, which may or may not correspond to a window (Tw). For example, the group includes a 1 ms TTI evaluated over a length of a slot 350 (i.e. the time period), and the sTTI in that same time period, e.g. slot 350, i.e. TTI(n), TTI(n+1) and TTI(n+2).

For the configuration in FIG. 16, the total configured maximum output power $P_{CMAX}$ shall be set within the following bounds:

$$P_{CMAX_L} \le P_{CMAX} \le P_{CMAX_H}$$

Where $$P_{CMAX_L} = \mathrm{MIN}\left\{\begin{matrix} P_{CMAX_L,1}(\mathrm{TTI}(m, s0)), P_{CMAX_L,2}(\mathrm{TTI}(n)), \\ P_{CMAX_L,2}(\mathrm{TTI}(n+1)), P_{CMAX_L,2}(\mathrm{TTI}(n+2)), \\ P_{PowerClass} \end{matrix}\right\}$$

$$P_{CMAX_H} = \mathrm{MIN}\left\{\begin{matrix} P_{CMAX_H,1}(\mathrm{TTI}(m, s0)), P_{CMAX_H,2}(\mathrm{TTI}(n)), \\ P_{CMAX_H,2}(\mathrm{TTI}(n+1)), P_{CMAX_H,2}(\mathrm{TTI}(n+2)), \\ P_{PowerClass} \end{matrix}\right\}$$

In this example, TTI(m,s0) refers to the 1 ms TTI in slot #0, for which $P_{CMAX_L}$ or $P_{CMAX_H}$ is in cell/carrier 1. The values of $P_{CMAX}$ are evaluated also for TTI(n), TTI(n+1) and TTI(n+2).

In this example, the above mentioned $P_{CMAX}$ is applied to the reference TTIs, i.e. to the TTI(n,s0) in cell1 (i.e. slot #0) and TTI(n), TTI(n+1) and TTI(n+2) in cell2. $P_{CMAX_L,a(b)}$ and $P_{CMAX_H,a(b)}$ are the $P_{CMAX,c}$ lower and higher limit respectively for cell a on TTI b. In this example, a minimum one of the group of evaluated parameters is selected. The evaluations may be carried out over the same and/or different time windows. A threshold value $P_{PowereClas}$ may optionally be included in the group to provide a minimum value of selected parameter.

A corresponding formulation applies for slot #1 of the 1 ms TTI, e.g. referring to the 1 ms TT1(m,s1) on cell 1 and TTI(n+3), TTI(n+4) and TTI(n+5) on cell 2.

The parameters may be determined by the wireless device. Optionally, information indicating the parameters defining $P_{CMAX}$ above may be signalled to the wireless device by the network node, or determined by the wireless device based on another received signalling or configuration of the wireless device, e.g. received from the network node.

Returning to FIG. 11, at step 306, wireless device 110 uses the determined maximum output power value to be used for the determined TTI(s) determined from step 304 for transmitting first signal (S1) and second signal (S2) to first cell (cell1) and second cell (cell2), respectively.

According to certain embodiments, the following sections may be modified in 3GPP TS 36.133 v14.1.0. The new changes are shaded in the following sections in in 3GPP TS 36.133 v14.1.0:

6.2.5A Configured Transmitted Power for CA

For uplink carrier aggregation the UE is allowed to set its configured maximum output power $P_{CMAX,c}$ for serving cell c and its total configured maximum output power $P_{CMAX}$.

The configured maximum output power $P_{CMAX,c}$ on serving cell c shall be set as specified in subclause 6.2.5.

For uplink inter-band carrier aggregation, $MPR_c$ and $A\text{-}MPR_c$ apply per serving cell c and are specified in subclause 6.2.3 and subclause 6.2.4, respectively. $P\text{-}MPR_c$ accounts for power management for serving cell c. $P_{CMAX,c}$ is calculated under the assumption that the transmit power is increased independently on all component carriers.

For uplink intra-band contiguous and non-contiguous carrier aggregation, $MPR_c$=MPR and $A\text{-}MPR_c$=A-MPR with MPR and A-MPR specified in subclause 6.2.3A and subclause 6.2.4A respectively. There is one power management term for the UE, denoted P-MPR, and $P\text{-}MPR_c$=P-MPR. $P_{CMAX,c}$ is calculated under the assumption that the transmit power is increased by the same amount in dB on all component carriers.

The total configured maximum output power $P_{CMAX}$ shall be set within the following bounds:

$$P_{CMAX_L} \leq P_{CMAX} \leq P_{CMAX_H}$$

For uplink inter-band carrier aggregation with one serving cell c per operating band, $$P_{CMAX_L}=\text{MIN}\{10\log_{10}\Sigma\text{MIN}[p_{EMAX,c}/(\Delta t_{C,c}), p_{PowerClass}/(mpr_c\cdot a\text{-}mpr_c\cdot\Delta t_{C,c}\cdot\Delta t_{IB,c}\cdot\Delta t_{ProSe}), p_{PowerClass}/pmpr_c],P_{PowerClass}\}$$

$$P_{CMAX_H}=\text{MIN}\{10\log_{10}\Sigma P_{EMAX,c}P_{PowerClass}\}$$

where $p_{EMAX,c}$ is the linear value of $P_{EMAX,c}$ which is given by IE P-Max for serving cell c in [7];

$P_{PowerClass}$ is the maximum UE power specified in Table 6.2.2A-1 without taking into account the tolerance specified in the Table 6.2.2A-1; $p_{PowerClass}$ is the linear value of $P_{PowerClass}$;

$mpr_c$ and $a\text{-}mpr_c$ are the linear values of $MPR_c$ and $A\text{-}MPR_c$ as specified in subclause 6.2.3 and subclause 6.2.4, respectively;

$pmpr_c$ is the linear value of $P\text{-}MPR_c$;

$\Delta t_{C,c}$ is the linear value of $\Delta T_{C,c}\times\Delta t_{C,c}$=1.41 when NOTE 2 in Table 6.2.2-1 applies for a serving cell c, otherwise $\Delta t_{C,c}$=1;

$\Delta t_{IB,c}$ is the linear value of the inter-band relaxation term $\Delta T_{IB,c}$ of the serving cell c as specified in Table 6.2.5-2; otherwise $\Delta t_{IB,c}$=1;

$\Delta t_{ProSe}$ is the linear value of $\Delta T_{ProSe}$ and applies as specified in subclause 6.2.5.

For uplink intra-band contiguous and non-contiguous carrier aggregation, $$P_{CMAX_L}=\text{MIN}\{10\log_{10}\Sigma p_{EMAX,c}-\Delta T_c P_{PowerClass}-\text{MAX}(\text{MPR}+\text{A-MPR}+\Delta T_{IB,c}+\Delta T_C+\Delta T_{ProSe},\text{P-MPR})\}$$

$$P_{CMAX_H}=\text{MIN}\{10\log_{10}\Sigma p_{EMAX,c},P_{PowerClass}\}$$

where $p_{EMAX,c}$ is the linear value of $P_{EMAX,c}$ which is given by IE P-Max for serving cell c in [7];

$P_{PowerClass}$ is the maximum UE power specified in Table 6.2.2A-1 without taking into account the tolerance specified in the Table 6.2.2A-1;

MPR and A-MPR are specified in subclause 6.2.3A and subclause 6.2.4A respectively;

$\Delta T_{IB,c}$ is the additional tolerance for serving cell c as specified in Table 6.2.5-2;

P-MPR is the power management term for the UE;

$\Delta T_c$ is the highest value $\Delta T_{C,c}$ among all serving cells c in the subframe over both timeslots. $\Delta T_{C,c}$=1.5 dB when NOTE 2 in Table 6.2.2A-1 applies to the serving cell c, otherwise $\Delta T_{C,c}$=0 dB;

$\Delta T_{ProSe}$ applies as specified in subclause 6.2.5.

For combinations of intra-band and inter-band carrier aggregation with UE configured for transmission on three serving cells (up to two contiguously aggregated carriers per operating band), $$P_{CMAX_L}=\text{MIN}\{10\log_{10}\Sigma(p_{CMAX_L,Bi}),P_{PowerClass}\}$$

$$P_{CMAX_H}=\text{MIN}\{10\log_{10}\Sigma p_{EMAX,c},P_{PowerClass}\}$$

where $p_{EMAX,c}$ is the linear value of $P_{EMAX,c}$ which is given by IE P-Max for serving cell c in [7];

$P_{PowerClass}$ is the maximum UE power specified in Table 6.2.2A-0 without taking into account the tolerance specified in the Table 6.2.2A-0; $p_{PowerClass}$ is the linear value of $P_{PowerClass}$;

$P_{CMAX_L,Bi}$ is the linear values of $P_{CMAX_L}$, as specified in corresponding operating band. $P_{CMAX_L,c}$ specified for single carrier in subclause 6.2.5 applies for operating band supporting one serving cell. $P_{CMAX_L}$ specified for uplink intra-band contiguous carrier aggregation in subclause 6.2.5A applies for operating band supporting two contiguous serving cells.

$T_{REF}$ and $T_{eval}$ have values specified in Table 6.2.5-0A. For each $T_{REF}$, the $P_{CMAX_L}$ is evaluated per $T_{eval}$ and given by the minimum value taken over the transmission(s) within the $T_{eval}$; the minimum $P_{CMAX_L}$ over $T_{REF}$ is then applied for the entire $T_{REF}$. $P_{Powerclass}$ shall not be exceeded by the UE during any period of time.

TABLE 6.2.5A-0A:

$P_{CMAX}$ evaluation window for different TTI patterns in carrier aggregation

| First TTI value used | Second TTI value used | Third TTI value used | $T_{REF}$ | $T_{eval}$ |
|---|---|---|---|---|
| 14 OS (1 ms) | NA | NA | 1 subframe | 1 slot |
| 2 OS | | | 2 OS | 2 OS |
| 4 OS | | | 4 OS | 4 OS |
| 7 OS | | | 7 OS | 7 OS |
| 2 OS | 4 OS | | 4 OS | 4 OS |
| 2 OS | 7 OS | | 7 OS | 7 OS |
| 4 OS | 7 OS | | 4 OS | 4 OS |
| 2 OS | 4 OS | 7 OS | 7 OS | 7 OS |
| 14 OS (1 ms) | 2 OS | NA | 7 OS | 7 OS |
| 14 OS (1 ms) | 2 OS | 7 OS | 7 OS | 7 OS |

In some aspects, the reference time may refer to a reference time period ($T_{REF}$ in the above table) or, independently, evaluation time ($T_{eval}$) in the above table). In some aspects, determining the maximum output power comprises determining a maximum output power parameter For the reference time being an evaluation time period, the maximum output power parameter is evaluated per reference time period (i.e. over the evaluation time, T_eval). The reference time is based on a length of the first time resource and/or the second time resource. In some aspects, the maximum output power parameter can be applied for the a reference time period ($T_{REF}$), which is based on a length of the first time resource and/or the second time resource. The evaluation time and reference time period may be the same (as shown in the table above) or different.

If the UE is configured with multiple TAGs and transmissions of the UE on $T_{REF}$ i for any serving cell in one TAG overlap some portion of the first symbol of the transmission on $T_{REF}$ i+1 for a different serving cell in another TAG, the UE minimum of $P_{CMAX_L}$ for $T_{REF}$ s i and i+1 applies for any overlapping portion of $T_{REF}$ s i and i+1. $P_{PowerClass}$ shall not be exceeded by the UE during any period of time.

The measured maximum output power $P_{UMAX}$ over all serving cells shall be within the following range:

$$P_{CMAX_L}-\mathrm{MAX}\{T_L, T_{LOW}(P_{CMAX_L})\} \leq P_{UMAX} \leq P_{CMAX_H} \leq T_{HIGH}(P_{CMAX_H})$$

$$P_{UMAX}=10\log_{10}\Sigma p_{UMAX,c}$$

where $p_{UMAX,c}$ denotes the measured maximum output power for serving cell c expressed in linear scale. The tolerances $T_{Low}(P_{CMAX})$ and $T_{HIGH}(P_{CMAX})$ for applicable values of $P_{CMAX}$ are specified in Table 6.2.5A-1 and Table 6.2.5A-2 for inter-band carrier aggregation and intra-band carrier aggregation, respectively. The tolerance $T_L$ is the absolute value of the lower tolerance for applicable E-UTRA CA configuration as specified in Table 6.2.2A-0, Table 6.2.2A-1 and Table 6.2.2A-2 for inter-band carrier aggregation, intra-band contiguous carrier aggregation and intra-band non-contiguous carrier aggregation, respectively.

TABLE 6.2.5A-1

$P_{CMAX}$ tolerance for uplink inter-band CA (two bands)

| $P_{CMAX}$ (dBm) | Tolerance $T_{LOW}(P_{CMAX})$ (dB) | Tolerance $T_{HIGH}(P_{CMAX})$ (dB) |
|---|---|---|
| $P_{CMAX}$ = 23 | 3.0 | 2.0 |
| 22 ≤ $P_{CMAX}$ < 23 | 5.0 | 2.0 |
| 21 ≤ $P_{CMAX}$ < 22 | 5.0 | 3.0 |
| 20 ≤ $P_{CMAX}$ < 21 | 6.0 | 4.0 |
| 16 ≤ $P_{CMAX}$ < 20 | 5.0 | |
| 11 ≤ $P_{CMAX}$ < 16 | 6.0 | |
| −40 ≤ $P_{CMAX}$ < 11 | 7.0 | |

TABLE 6.2.5A-2

$P_{CMAX}$ tolerance

| $P_{CMAX}$ (dBm) | Tolerance $T_{LOW}(P_{CMAX})$ (dB) | Tolerance $T_{HIGH}(P_{CMAX})$ (dB) |
|---|---|---|
| 21 ≤ $P_{CMAX}$ ≤ 23 | 2.0 | |
| 20 ≤ $P_{CMAX}$ < 21 | 2.5 | |
| 19 ≤ $P_{CMAX}$ < 20 | 3.5 | |
| 18 ≤ $P_{CMAX}$ < 19 | 4.0 | |
| 13 ≤ $P_{CMAX}$ < 18 | 5.0 | |
| 8 ≤ $P_{CMAX}$ < 13 | 6.0 | |
| −40 ≤ $P_{CMAX}$ < 9 | 7.0 | |

Figure 17:
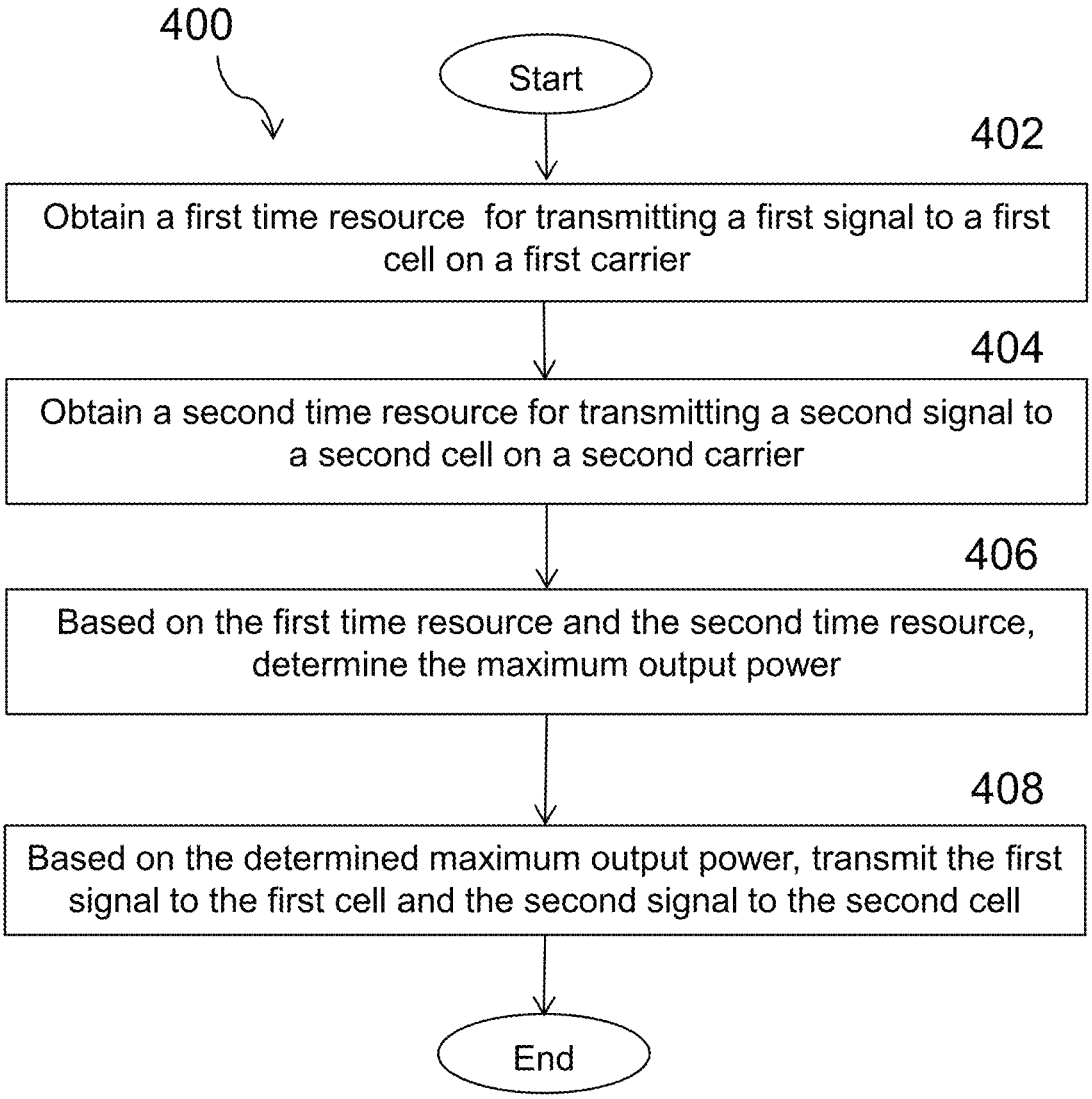
FIG. 17 illustrates another example method by a wireless device for deriving maximum output power, according to certain embodiments.

FIG. 17 illustrates an exemplary method 400 by wireless device 110 for deriving maximum output power, according to certain embodiments. The method begins at step 402 when wireless device 110 obtains a first time resource for transmitting a first signal in a first cell on a first carrier. At step 404, wireless device 110 also obtains a second time resource for transmitting a second signal in a second cell on a second carrier. In a particular embodiment, the first time resource is a first TTI and the second time resource is a second TTI. The first time resource has a first TTI length and the second TTI has a second TTI length. The first TTI lengths may be the same or different. In a particular embodiment, at least one of the first TTI and the second ITT may be a short TTI, i.e. less than 1 ms. In some aspects, one of the first TTI and the second TTI short TTI (e.g. 2, 3, 4 or 7 symbol sTTI) and the other of the first TTI and the second TTI is 1 ms (i.e. 14 symbol TTI). In another example, the first TTI and the second TTI are different lengths of short TTI, e.g. 2 and 7 symbol TTI respectively. In another embodiment, the first time resource are referred to as a first mini-slot and the second time resource is a second mini-slot. Corresponding examples apply with this terminology.

According to certain embodiments, the first cell may be an uplink serving cell of wireless device 110. In a particular embodiment, for example, the uplink serving cell is a primary cell or a secondary cell.

According to certain embodiments, at least one of the first time resource and the second time resource may be obtained based on at least one respective characteristic. In various particular embodiments, for example, the at least one characteristic may include one or more of a relationship between the first time resource and a first frequency band, a configuration received from the network node, a pre-defined rule, and blind detection.

At step 406, wireless device 110 determines the maximum output power based on the first time resource and the second time resource. According to certain embodiments, determining the maximum output power may include determining a reference time based on at least one of the first time resource and the second time resource and determining the maximum output power bused on the reference time. In a particular embodiment, the reference time may be one slot, one mini-slot, 2OS, 4OS, or 7OS. In a particular embodiment, the reference time may be determined as a function of a length of at least one of the first time resource and the second time resource. For example, the reference time may be a lowest common multiple of a length of the first time resource and a length of the second time resource, a highest of the length of the first time resource and the length of the second time resource, a fraction of the length of the first time resource or the length of the second time resource, a half of the length of the first time resource or the length of the second time resource, a fraction of a highest of the length of the first time resource or the length of the second time resource, a half of a highest of the length of the first time resource or the length of the second time resource, or a value configured for at least one of the first time resource and the second time resource.

According to certain embodiments, determining the maximum output power may include determining a maximum output power parameter, $P_{CMAX_L}$, and the reference time is an evaluation time period, wherein the maximum output power parameter is evaluated per reference time period (T_eval). The reference tune may be based on a length of the first time resource and/or the second time resource. In a particular embodiment, the maximum output power parameter may be a lower bound for a configured maximum output power ($P_{CMAX_L}$).

According to a particular embodiment, the reference time may be determined based on a plurality of evaluations of the power parameter for different values of the first time resource and the second time resource. For example, the reference time may be determined by performing a comparison of the reference time for a plurality of different lengths of the first time resource and the second time resource. In a particular embodiment, each of the plurality of evaluations of the power parameter may be evaluated within a time period ($T_{eval}$) that is the same as the reference time. In another embodiment, each of the plurality of evaluations of the power parameter may be performed within a time period ($T_{eval}$) that is different from the reference time. Thus, it is recognized that the reference time and the time period over which the evaluations are performed ($T_{eval}$) may be independently determined and may be the same or different, according to particular embodiments.

According to still other embodiments, a first reference time may be determined based on the first time resource and a second reference time may be determined based on the second time resource. The maximum output power may then be determined based on the first reference time and the second reference time. In a particular embodiment, the first reference time may be different from the second reference time. In another embodiment, the first reference time may be the same as the second reference time.

At step 408, wireless device 110 transmits, based on the determined maximum output power, the first signal to the first cell and the second signal to the second cell. In a particular embodiment, the first signal may be transmitted to the first cell on a physical uplink control channel (PUCCH), a physical uplink shared channel (PUSCH), a short physical uplink control channel (sPUCCH), or short physical uplink shared channel (sPUSCH).

In certain embodiments, the methods for deriving maximum output power as described above may be performed by, a virtual computing device. FIG. 8 illustrates an example virtual computing device 400 for deriving maximum output power, according to certain embodiments. In certain embodiments, virtual computing device 400 may include modules for performing steps similar to those described above with regard to the method illustrated and described in FIG. 11 or 17. For example, virtual computing device 400 may include at least one obtaining module 410, at least one determining module 420, at least one transmitting module 430, and any other suitable modules for deriving maximum output power with different TTI patterns. In some embodiments, one or more of the modules may be implemented using one or more processors 220 of FIG. 10. In certain embodiments, the functions of two or more of the various modules may be combined into a single module.

The obtaining module 410 may perform the obtaining functions of virtual computing device 400. For example, in a particular embodiment, obtaining module 410 may obtain a first time resource for transmitting a first signal in a first cell on a first carrier. Additionally, obtaining module 410 or another obtaining module may also obtain a second time resource for transmitting a second signal m a second cell on a second carrier. In a particular embodiment, for example, obtaining module 410 may obtain or determine a first TTI used for operating a first signal (S1) between a first cell on a first carrier and wireless device 110 and a second TTI used for operating a second signal (S2) between a second cell on a second carrier and wireless device 110. In certain embodiments, the configuration of the first TTI may be performed by receiving a message from network node 115. In particular embodiment, for example, the message may include an RRC message. For example, in a particular embodiment, The determining module 420 may perform the determining functions of virtual computing device 400. For example, in a particular embodiment, determining module 420 may determine a maximum output power parameter (P1) based on determined values of the first time reference and the second time reference. The estimation of P1 may be done over a reference time, which may be referred to as window or duration (Tw) which depends on at least the first time reference and the second time reference used by wireless device 110 for at least transmitting signals in its serving cells (first cell and second cell), respectively. The parameter TV may also be referred to as reference time, reference TTI length or window, TTI reference (TTIref), Pcmax reference time, estimation period of max power etc.

The transmitting module 430 may perform the transmitting functions of virtual computing device 400. For example, in a particular embodiment, transmitting module 430 may use the determined maximum output power parameter (P1) to transmit first signal (S1) and second signal (S2) to first cell (cell1) and second (cell2), respectively.

Figure 18:
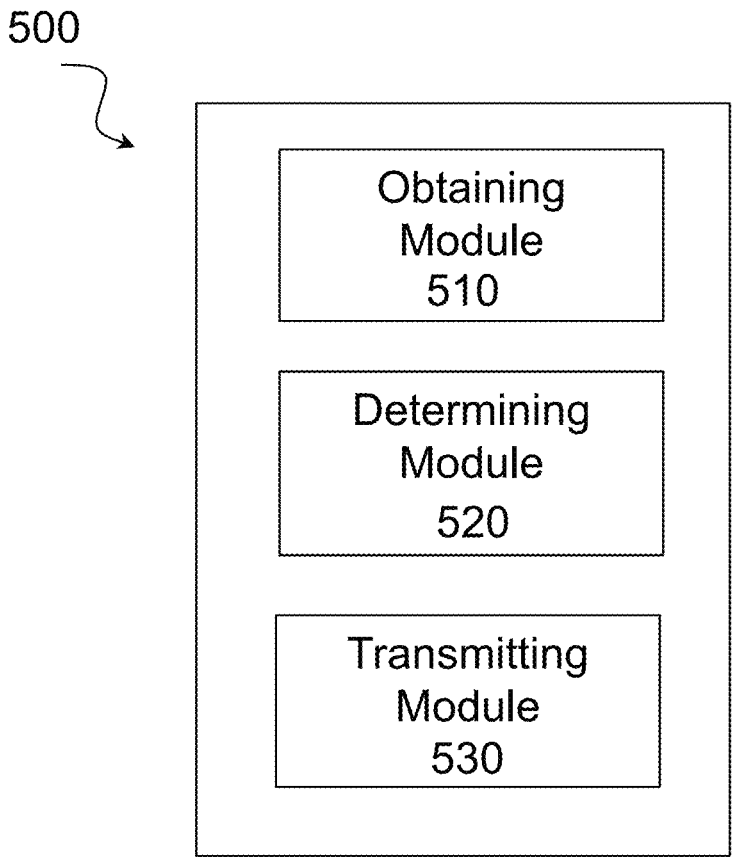
FIG. 18 illustrates an example virtual computing device for deriving maximum output power, according to certain embodiments.

Other embodiments of virtual computing device 400 may include additional components beyond those shown in FIG. 18 that may be responsible for providing certain aspects of the radio node's functionality, including any of the functionality described above and/or any additional functionality (including any functionality necessary to support the solutions described above). The various different types of wireless devices 110 and network nodes 115 may include components having the same physical hardware but configured (e.g., via programming) to support different radio access technologies, or may represent partly or entirely different physical components.

Figure 19:
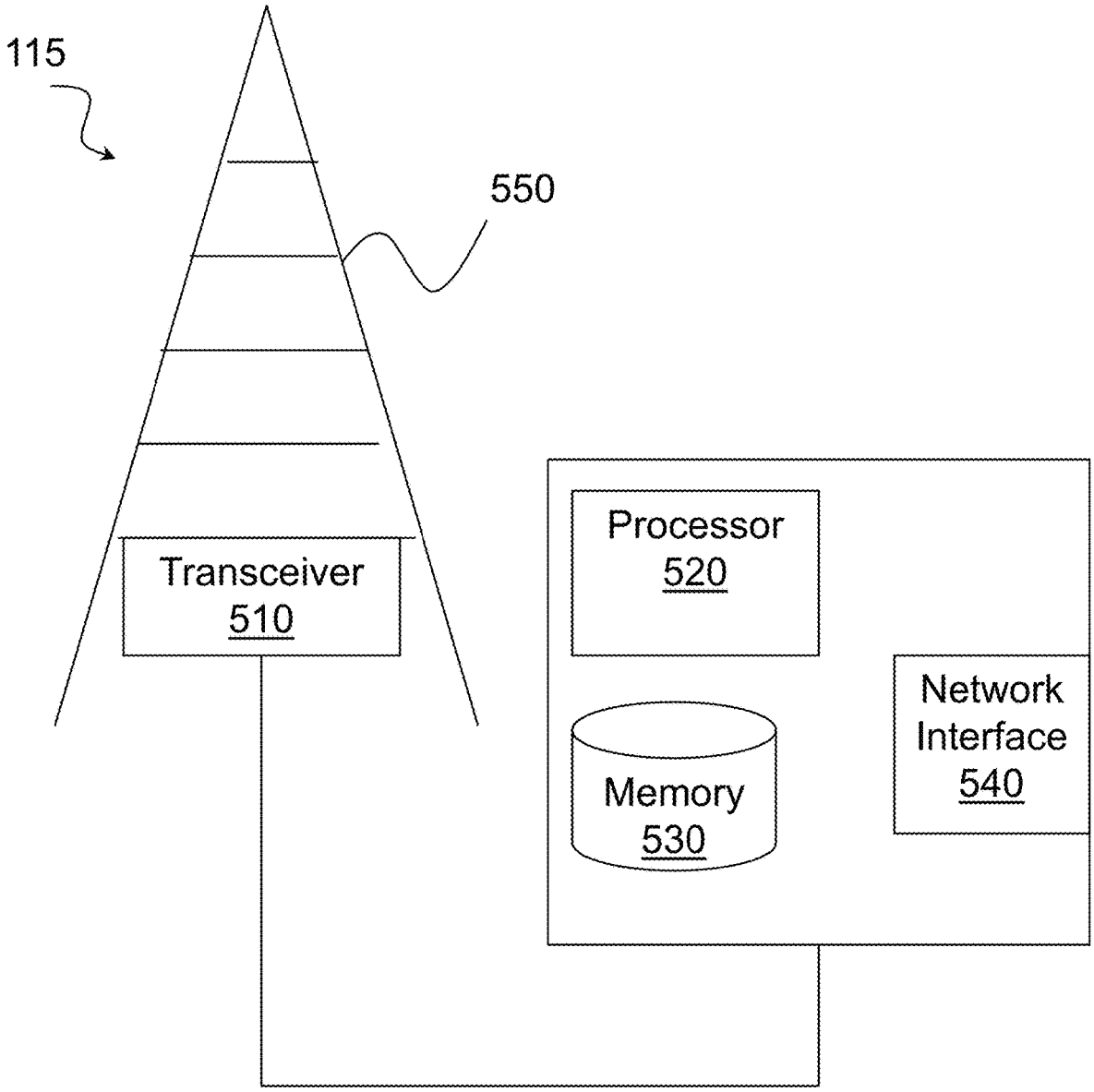
FIG. 19 illustrates an example network node for deriving maximum output power, according to certain embodiments.

FIG. 19 illustrate an example network node 115 for deriving configured output power with different TTI patterns, according to certain embodiments. As described above, network node 115 may be any type of radio network node or any network node that communicates with a wireless device and/or with another network node. Examples of a network node 115 are provided above.

Network nodes 115 may be deployed throughout network 100 as a homogenous deployment, heterogeneous deployment, or mixed deployment. A homogeneous deployment may generally describe a deployment made up of the same (or similar) type of network nodes 115 and/or similar coverage and cell sizes and inter-site distances. A heterogeneous deployment may generally describe deployments using a variety of types of network nodes 115 having different cell sizes, transmit powers, capacities, and inter-site distances. For example, a heterogeneous deployment may include a plurality of low-power nodes placed throughout a macro-cell layout. Mixed deployments may include a mix of homogenous portions and heterogeneous portions.

Network node 115 may include one or more of transceiver 510, processor 520, memory 530, and network interface 540. In some embodiments, transceiver 510 facilitates transmitting wireless signals to and receiving wireless signals from wireless device 110 (e.g., via an antenna), processor 520 executes instructions to provide some or all of the functionality described above as being provided by a network node 115, memory 530 stores the instructions executed by processor 520, and network interface 540 communicates signals to backend network components, such as a gateway, switch, router, Internet, Public Switched Telephone Network (PSTN), core network nodes or radio network controllers, etc.

In certain embodiments, network node 115 may be capable of using multi-antenna techniques, and may be equipped with multiple antennas and capable of supporting MIMO techniques. The one or more antennas may have controllable polarization. In other words, each element may have two co-located sub elements with different polarizations (e.g., 90 degree separation as in cross-polarization), so that different sets of beamforming weights will give the emitted wave different polarization.

Processor 520 may include any suitable combination of hardware and software implemented in one or more modules to execute instructions and manipulate data to perform some or all of the described functions of network node 115. In some embodiments, processor 520 may include, for example, one or more computers, one or more central processing units (CPUs), one or more microprocessors, one or more applications, processing circuitry, and/or other logic.

Memory 530 is generally operable to store instructions, such as a computer program, software, an application including one or more of logic, rules, algorithms, code, tables, etc. and or other instructions capable of being executed by a processor. Examples of memory 530 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable anchor computer-executable 111 memory devices, that store information.

In some embodiments, network interface 540 is communicatively coupled to processor 520 and may refer to any satiable device operable to receive input for network node 115, send output from network node 115, perform suitable processing of the input or output or both, communicate to other devices, of any combination of the preceding. Network interface 540 may include appropriate hardware (e.g., port, modem, network interface card, etc.) and software, including protocol conversion and data processing capabilities, to communicate through a network.

Other embodiments of network node 115 may include additional components beyond those shown in FIG. 19 that may be responsible for providing certain aspects of the radio network node's functionality, including any of the functionality described above and/or any additional functionality (including any functionality necessary to support the solutions described above). The various different types of network nodes may include components having the same physical hardware but configured (e.g., via programming) to support different radio access technologies, or may represent partly or entirely different physical components.

Figure 20:
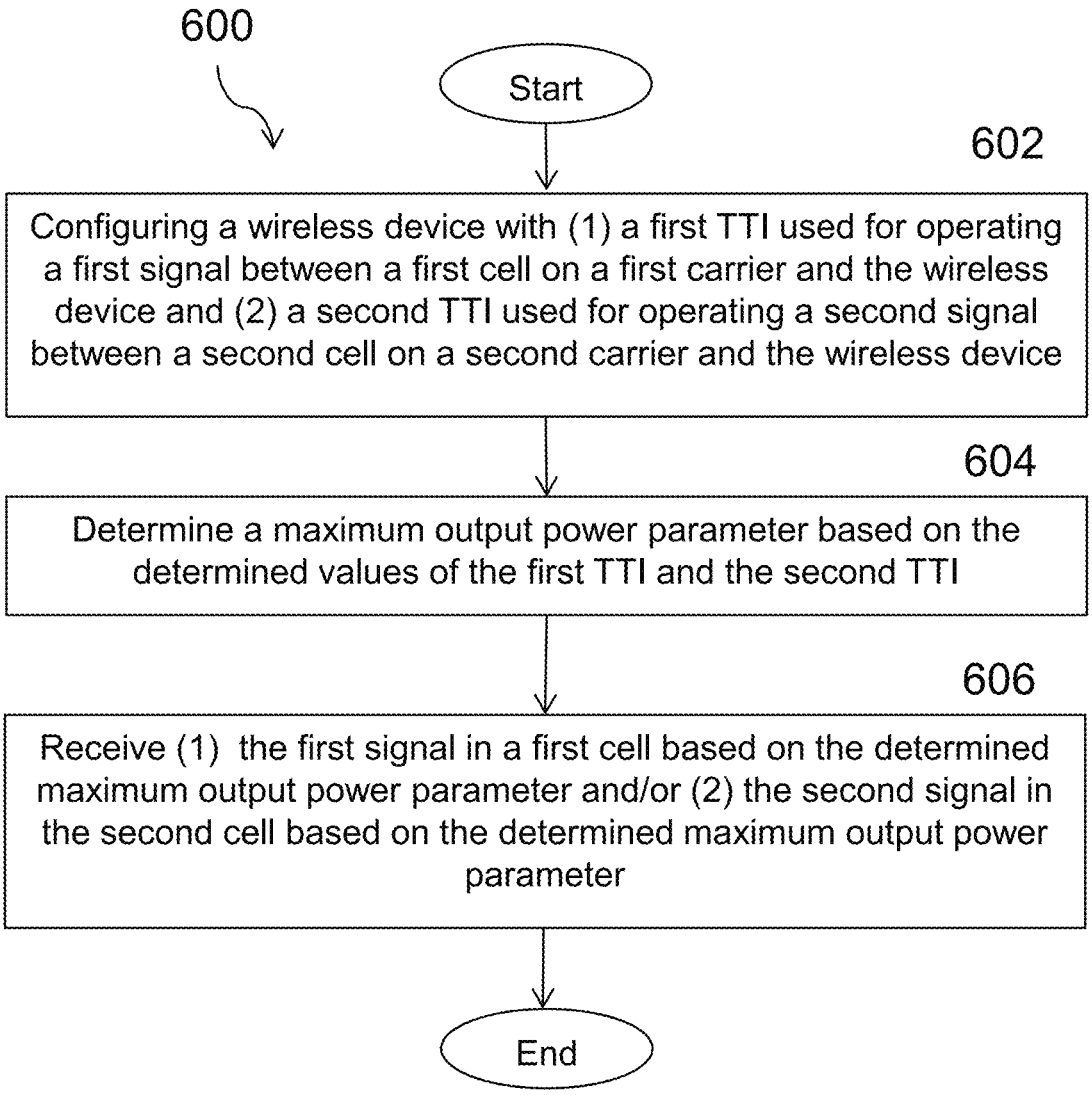
FIG. 20 illustrates an example method by a network node for deriving maximum output power, according to certain embodiments.

FIG. 20 illustrates an exemplary method 600 by network node 115 for deriving maximum output power with different time resources, according to certain embodiments. The method begins at step 602, when network node 115 configures wireless device 110 with a first TTI (TTI) used for operating a first signal (S1) between a first cell (cell1) on the first carrier (F1) and the wireless device 110 and with a second TTI (TTI2) used for operating a second signal (S2) on a second carrier (F2) between a second cell (cell2) and wireless device 110.

In certain embodiments, network node 115 may also configure wireless device 110 with a plurality of TTIs for a corresponding plurality of serving cells of wireless device 110. The embodiments are applicable for any number of TTIs configured for any number of corresponding serving cells of wireless device 110.

The configuration of the first TTI and the second TTI may be performed by transmitting a message to wireless device 110. For example, the first TTI and the second TTI may be transmitted in a RRC message. The configuration of the first TTI and the second TTI may be performed via the same or different messages.

Prior to configuration, network node 115 may determine the value of first TTI and second TTI or the need to configure first TTI and second TTI. For example, network node 115 may determine the specific values first TTI and second TTI. Network node 115 may determine the values of first TTI and second TTI based on for example one or more of the following principles:

- UE capability whether it supports two or more different TTIs on each serving cell, e.g. ITT=1 ms and TTI=0.14 ms.
- The required UE bit rate on each serving cell, e.g. on first cell and second cell.
- The round trip time (RTT) required to deliver data packet between wireless device 110 and network node 115 or between wireless devices, e.g. shorter TTI is used in case shorter RTT is required.
- The wireless device location with respect to the serving cell. For example shorter TTI is used if the wireless device 110 is close to the serving cell such as, for example, when wireless device 110 is close to the network node serving first cell (cell1).

At step 604, network node 115 determines a UE maximum output power parameter (P1) based on the configured values of the first TTI and the second TTI. The parameter P1 is used by the wireless device 110 for transmitting UL signals in first cell and second cell.

In certain embodiments, network node 115 may determine the value of P1 based on a relation or mapping between TTIs and the maximum out power parameters. The mapping may contain at least two set of TTIs for the corresponding two sets of serving cells of the wireless device 110 and the corresponding value of the estimation period (aka Pcmax window or reference window) for estimating the maximum output power. Network node 115 may determine the value of P1 using the same principles as described above with respect to the method of wireless device 110.

At step 606, network node 115 receives a first signal (S1) from wireless device 110 in a first cell over the configured first TTI and/or second signal (S2) from wireless device in the second cell over the configured second TTI, wherein the wireless device 110 transmit power does not exceed the determined value of P1 in the first cell and the second cell.

In certain embodiments, network node 115 may further adapt its receiver configuration base on the determined value of P1. For example, if P1 used by wireless device 110 for transmitting signals to the first cell is estimated by wireless device 110 over a time window smaller than a threshold (e.g. 300 μs), then network node 115 may use more robust receiver for receiving the first signal (S1). But if the value of P1 used by wireless device 110 for transmitting signals to the first cell is estimated by wireless device 110 over a time window not smaller than a threshold (e.g. 300 μs), then network node 115 may use less robust receiver for receiving the first signal (S1). A more robust receiver may mitigate interference more effectively compared to the receiver which is less robust. However, the more robust receiver may consume more power and requires more processing and complex operations compared to the latter receiver type.

In certain embodiments, the adaptation of the receiver type will enable network node 115 to enhance the UE coverage.

In certain embodiments and optionally, network node 115 may use the determined UE maximum output power value determined in step 604 and/or also the window (Tw) over which the value of P1 is estimated by wireless device 110, for performing one or more operational tasks. Examples of tasks are:

performing radio measurements in the network node, adapting TTI of the UE in DL and/or in U in cell1 and/or in cell2, adapting TTI of the UE in cell1 and/or in cell2 in different time resources, power control operation of the UE in cell1 and/or in cell2, transmitting information about the determined value of P1 and/or Tw to other nodes.

Figure 21:
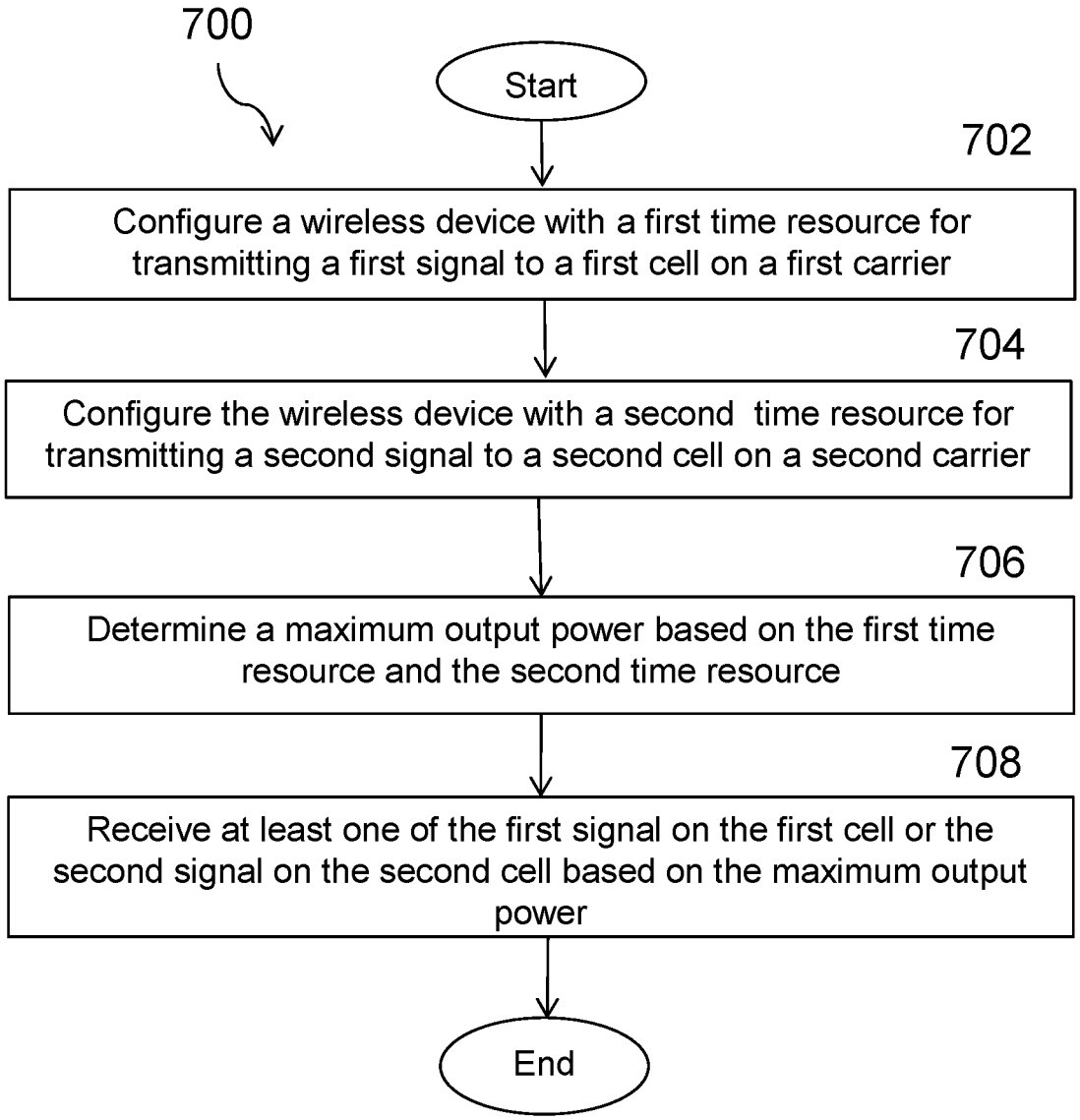
FIG. 21 illustrates another example method by a network node for deriving maximum output power, according to certain embodiments.

FIG. 21 illustrates an exemplary method 600 by network node 115 for deriving configured output power with different TTI patterns in carrier aggregation, according to certain embodiments. The method begins at step 702 when network node 115 configures a wireless device 110 with a first time resource for transmitting a first signal in a first cell on a first carrier. At step 704, network node 115 also configures the wireless device with a second time resource for transmitting a second signal in a second cell on a second carrier. In a particular embodiment, the first time resource may include a first transmission time interval (TTI) and the second time resource may include a second TTI. In another embodiment, the first time resource may include a first mini-slot and the second time resource comprises a second mini-slot.

At step 706, network node 115 determines a maximum output power based on the first time resource and the second time resource. According to certain embodiments, for example, network node 115 may determine a reference time based on at least one of the first time resource and the second time resource and determine the maximum output power based on the reference time. In a particular embodiment, the reference time may be determined as a function of a length of at least one of the first time resource and the second time resource. As examples, the reference time may be a lowest common multiple of a length of the first time resource and a length of the second time resource, a highest of the length of the first time resource and the length of the second time resource, a fraction of the length of the first time resource or the length of the second time resource, a half of the length of the first time resource or the length of the second time resource, a fraction of a highest of the length of the first time resource or the length of the second time resource, a half of a highest of the length of the first time resource or the length of the second time resource, or a value configured for at least one of the first time resource and the second time resource.

At step 708, network node 115 receives at least one of the first signal on the first cell or the second signal on the second cell based on the maximum output power.

According to certain embodiments, network node 115 may additionally perform one or more operations based on the maximum output power. For example, network node 115 may receive at least one of the first signal in the first cell or the second signal in the second cell based on the maximum output power. In another particular embodiment, for example, network node 115 may adapt uplink scheduling of at least one of the first signal in the first cell and the second signal in the second cell. In other embodiments, network node 115 may perform any one or more of the following operations based on the maximum output power: adapt the first time resource of the wireless device in the downlink or the uplink in the first cell, adapt the second time resource of the wireless device in the downlink or the uplink in the second cell, perform a power control operation of the wireless device in at least one of the first cell and the second cell, transmit information about a determined value of the maximum output power to a another network node, and transmit information about a reference time determine based on at least one of the first time resource and the second time resource to another network node.

Figure 22:
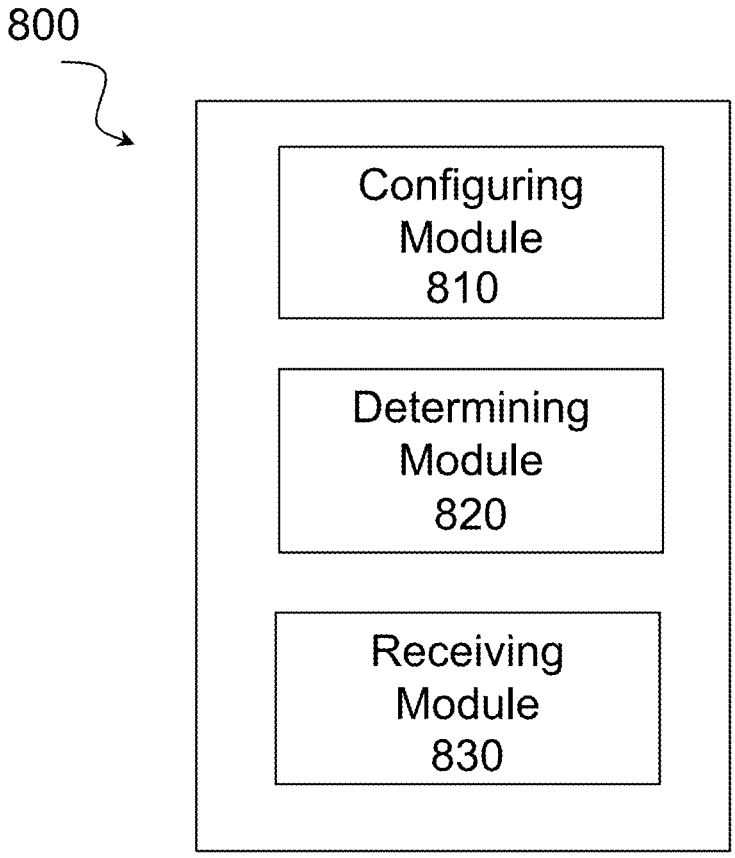
FIG. 22 illustrates another example virtual computing device for deriving maximum output power, according to certain embodiments.

In certain embodiments, the method for deriving maximum output power as described above may be performed by a virtual computing device. FIG. 22 illustrates an example virtual computing device 800 for deriving maximum output power, according to certain embodiments. In certain embodiments, virtual computing device 800 may include modules for performing steps similar to those described above with regard to the method illustrated and described in FIGS. 20 and 21. For example, virtual computing device 800 may include at least one configuring module 810, at least one determining module 820, at least one receiving module 830, and any other suitable modules for deriving configured output power with different TTI patterns. In some embodiments, one or more of the modules may be implemented using one or more processors 520 of FIG. 19. In certain embodiments, the functions of two or more of the various modules may be combined into a single module.

The configuring module 810 may perform the configuring functions of virtual computing device 800. For example, in a particular embodiment, configuring module 810 may configure wireless device 810 with a first time resource for transmitting a first signal in a first cell on a first carrier. Additionally, configuring module 810 or another configuring module may configure wireless device 810 with a second time resource for transmitting a second signal in a second cell on a second carrier. For example, configuring module 810 may configure wireless device 110 with a first TTI (TTI1) used for operating a first signal (S1) between a first cell (cell1) on the first carrier (F1) and the wireless device 110 and with a second TTI (TTI2) used for operating a second signal (S2) on a second carrier (F2) between a second cell (cell2) and wireless device 110.

In certain embodiments, configuring module 710 may also configure wireless device 110 with a plurality of TTIs for a corresponding plurality of serving cells of wireless device 110. The embodiments are applicable for any number of TTIs configured for any number of corresponding serving cells of wireless device 110.

The determining module 720 may perform the determining functions of virtual computing device 700. For example, in a particular embodiment, determining module 720 may determine a UE maximum output power parameter (P1) based on the configured values of the first time resource and the second resource. The parameter P1 is used by the wireless device 110 for transmitting UL signals in first cell and second cell.

In certain embodiments, determining module 720 may determine the value of P1 based on a relation or mapping between TTIs and the maximum out power parameters. The mapping may contain at least two set of TTIs for the corresponding two sets of serving cells of the wireless device 110 and the corresponding value of the estimation period (aka Pcmax window or reference window) for estimating the maximum output power. Network node 115 may determine the value of P1 using the same principles as described above with respect to the method of wireless device 110.

The receiving module 830 may perform the receiving functions of virtual computing device 800. For example, in a particular embodiment, receiving module 830 may receive a first signal (S1) from wireless device 110 in a first cell over the configured first time resource and/or second signal (S2) from wireless device in the second cell over the configured second time resource, wherein the wireless device 110 transmit power does not exceed the determined value of P1 in the first cell and the second cell.

Other embodiments of virtual computing device 700 may include additional components beyond those shown in FIG. 20 that may be responsible for providing certain aspects of the radio node's functionality, including any of the functionality described above and/or any additional functionality (including any functionality necessary to support the solutions described above). The various different types of wireless devices 110 and network nodes 115 may include components having the same physical hardware but configured (e.g., via programming) to support different radio access technologies, or may represent partly or entirely different physical components.

According to certain embodiments, a method by a wireless device for deriving configured output power with different TTI patterns for carrier aggregation is provided that includes:

obtaining or determining (1) a first TTI used for operating a first signal between a first cell on a first carrier and the wireless device and (2) a second TTI used for operating a second signal between a second cell on a second carrier and the wireless device;

determining a maximum output power parameter based on the determined value of the first TTI and the determined value of the second TTI;

based on the determined maximum output power parameter, transmitting the first signal to a first cell and the second signal to the second cell optionally, the first cell comprises a serving cell of the wireless device;

optionally, the serving cell comprises a primary cell;

optionally, the serving cell comprises a secondary cell;

optionally, the first cell comprises a uplink (UL) serving cell;

optionally, operating a first signal comprises receiving one or more signals by the wireless device from the first cell, wherein the first signal may be received on the PDCCH, PDSCH, sPDCCH, or sPDSCH;

optionally, operating a first signal comprises transmitting one or more signals by the wireless device on the first cell, wherein the first signal may be transmitted on the PUCCH, PUSCH, sPUCCH, or sPUSCH.

optionally, operating the first signal comprises transmitting the one or more signals by the wireless device to the first cell;

optionally, the first TTI may be obtained or determined based on at least one characteristic selected from the group consisting of:

pre-defined information, such as a relationship between the first TTI and a first frequency band;

a configuration received from the network node;

pre-defined rule;

blind detection;

optionally, a reference time or window (Tw, $TTI_{REF}$) is used for determining the maximum output power parameter. The window may be based on, or be a function of, one or more of the TTI lengths. Optionally, the window has a length determined or obtained as one of: a lowest common multiple of the TTI lengths, a highest of the TTI lengths, a fraction of one of the TTI lengths, a half of one of the TTI lengths, a fraction (e.g. half) of the highest of the TTI lengths or a predetermined value, e.g. 7 OFDM symbols, optionally according to the TTI lengths.

optionally, a parameter for configuring the maximum output power is based on a plurality of evaluations of the parameter for different TTI instances. For example, the parameter is based on a comparison of the parameter for a plurality of different TTI lengths and/or a comparison of the parameter for a plurality of different TTIs. Optionally, the compared parameters are evaluated within a time period, which may be the same or different to the reference time. Optionally, the evaluated parameter is for TTIs on one or more carriers/cells. The reference time may be different for the evaluated TTIs. Optionally, the reference time is one slot. Optionally, the parameter may be evaluated separately in each reference time. Optionally, a minimum one of the evaluated parameters is selected.

According to certain embodiments, a wireless device for deriving configured output power with different TTI patterns for carrier aggregation is provided that includes a memory storing instructions and a processor configured to execute the instructions to cause the processor to:

obtain or determine (1) a first used for operating a first signal between a first cell on a first carrier and the wireless device and (2) a second TTI used for operating a second signal between a second cell on a second carrier and the wireless device;

determine a maximum output power parameter based on the determined value of the first TTI and the determined value of the second TTI;

based on the determined maximum output power parameter, transmit the first signal to a first cell and the second signal to the second cell optionally, the first cell comprises a serving cell of the wireless device;

optionally, the serving cell comprises a primary cell;

optionally, the serving cell comprises a secondary cell;

optionally, the first cell comprises a uplink (UL) serving cell;

optionally, operating a first signal comprises receiving one or more signals by the wireless device from the first cell, wherein the first signal may be received on, the PDCCH, PDSCH, sPDCCH, or sPDSCH;

optionally, operating a first signal comprises transmitting one or more signals by the wireless device on the first cell, wherein the first signal may be transmitted on the PUCCH, PUSCH, sPUCCH, or sPUSCH.

optionally, operating the first signal comprises transmitting the one or more signals by the wireless device to the first cell;

optionally, the first TTI may be obtained or determined based on at least one characteristic selected from the group consisting of:

pre-defined information, such as a relationship between the first TTI and a first frequency band;

a configuration received from the network node;

pre-defined rule;

blind detection;

optionally, a reference time or window (Tw, $TTI_{REF}$) is used for determining the maximum output power parameter. The window may be based on, or be a function of, one or more of the TTI lengths. Optionally, the window has a length determined or obtained as one of a lowest common multiple of the TTI lengths, a highest of the TTI lengths, a fraction of one of the TTI lengths, a half of one of the TTI lengths, a fraction (e.g. half) of the highest of the TTI lengths or a predetermined value, e.g. 7 OFDM symbols, optionally according to the TTI lengths.

optionally, a parameter for configuring the maximum output power is based on a plurality of evaluations of the parameter for different TTI instances. For example, the parameter is based on a comparison of the parameter for a plurality of different TTI lengths and/or a comparison of the parameter for a plurality of different TTIs. Optionally, the compared parameters are evaluated within a time period, which may be the same or different to the reference time. Optionally, the evaluated parameter is for TTIs on one or more carriers/cells. The reference time may be different for the evaluated TTIs. Optionally, the reference time is one slot. Optionally, the parameter may be evaluated separately in each reference time. Optionally, a minimum one of the evaluated parameters is selected.

According to certain embodiments, a method by a network node for deriving configured output power with different TTI patterns is provided for carrier aggregation that includes:

configuring a wireless device with (1) a first TTI used for operating a first signal between a first cell on a first carrier and the wireless device and (2) a second TTI used for operating a second signal between a second cell on a second carrier and the wireless device;

to determining a maximum output power parameter based on the configured value of the first TTI and the configured value of the second TTI;

receiving (1) the first signal in a first cell from the wireless device based on the determined maximum output power parameter anti or (2) the second signal in the second cell based on the determined maximum output power parameter;

optionally, the method further includes configuring the wireless device with a plurality of for a corresponding plurality of serving cells;

optionally, the method further includes transmitting a message to the wireless device, the message comprising an RRC message;

optionally, the method further includes transmitting, to the wireless device, a first message comprising the first TTI and a second message comprising the second TTI;

optionally, the method further includes determining a first value for the first TTI and second value for the second TTI based one or mine of whether the wireless device supports two or more different TTIs on each serving cell;

the required UE bit rate on each serving cell the round trip time required to deliver data packet between the wireless device and the network node;

the location of the wireless device with respect to the serving cell, optionally the method includes using the received signals and/or the determined maximum output power parameter to perform one or more of the following tasks:

performing radio measurements in the network node adapting the first TTI of the wireless device in the DL and/or in the UL in the first cell;

adapting the first TTI of the wireless device in the first cell in different time resources;

performing a power control operation of the wireless device in the first cell; and transmitting information about the determined maximum output power parameter and a transmission window to at least one node;

optionally, the method includes determining the value of P1 based on a relation or mapping between the TTIs and the maximum out power parameters.

optionally, the method includes using a reference time or window (Tw, TTIREF) is used for determining the maximum output power parameter. The window may be based on, or be a function of, one or more of the lengths, Optionally, the window has a length determined or obtained as one of: a lowest common multiple of the TTI lengths, a highest of the TTI lengths, a fraction of one of the TTI lengths, a half of one of the TTI lengths, a fraction (e.g. half) of the highest of the TTI lengths or a pre-determined value, e.g. 7 OFDM symbols, optionally according to the TTI lengths.

optionally, the method includes using a parameter for configuring the maximum output power based on a plurality of evaluations of the parameter for different TTI instances. For example, the parameter is based on a comparison of the parameter for a plurality of different TTI lengths and/or a comparison of the parameter for a plurality of different TTIs. Optionally, the compared parameters are evaluated within a time period, which may be the same or different to the reference time. Optionally, the evaluated parameter is for TTI, on one or more carriers/cells. The reference time may be different for the evaluated TTIs. Optionally, the reference time is one slot. Optionally, the parameter may be evaluated separately in each reference time. Optionally, a minimum one of the evaluated parameters is selected.

According to certain embodiments, a network node for deriving configured output power with, different TTI patterns for carrier aggregation is provided. The network node includes a memory storing instructions and a processor configured to execute the instructions to cause the processor to:

configure a wireless device with (1) a first TTI used for operating a first: signal between a first cell on a first carrier and the wireless device and (2) a second TTI used for operating a second signal between a second cell on a second carrier and the wireless device;

determine a maximum output power parameter based on the configured value of the first TTI and the configured value of the second TTI;

receive (1) the first signal in a first cell from the wireless device based on the determined maximum output power parameter and/or (2) the second signal in the second cell based on the determined maximum output power parameter;

optionally, the method further includes configuring the wireless device with a plurality of TTIs for a corresponding plurality of serving cells;

optionally, the method further includes transmitting a message to the wireless device, the message comprising an RRC message;

optionally, the method further includes transmitting, to the wireless device, a first message comprising the first TTI and a second message comprising the second TTI:

optionally, the method further includes determining a first value for the first TTI and second value for the second. TTI based one or more of whether the wireless device supports two or more different TTIs on each serving cell;

to the required UE bit rate on each serving cell the round trip time required to deliver data packet between the wireless device and the network node;

the location of the wireless device with respect to the serving cell.

optionally the method includes using the received signals and/or the determined maximum output power parameter to perform, one or more of the following tasks:

performing radio measurements in the network node adapting the first TTI of the wireless device in the DL and/or in the UL in the first cell;

adapting the first TTI of the wireless device in thy first cell in different time resources;

performing a power control operation of the wireless device in the first cell; and transmitting information about the determined maximum output power parameter and a transmission window to at least one node;

optionally, the method includes determining the value of P1 based on a relation or mapping between the TTIs and the maximum out power parameters.

optionally the method includes using a reference time or window (Tw, TTIREF) for determining the maximum output power parameter. The window may be based on, or be a function of, one or more of the TTI lengths. Optionally, the window has a length determined or obtained as one of: a lowest common multiple of the TTI lengths, a highest of the TTI lengths, a fraction of one of the TTI lengths, a half of one of the TTI lengths, a fraction (e.g. halt) of the highest of the TTI lengths or a pre-determined value, e.g. 7 OFDM symbols, optionally according to the TTI lengths.

optionally, the method includes using a parameter for configuring the maximum output power based on a plurality of evaluations of the parameter for different TTI instances. For example, the parameter is based on a comparison of the parameter for a plurality of different TTI lengths and/or a comparison of the parameter for a plurality of different TTIs. Optionally, the compared parameters are evaluated within a time period, which may be the same or different to the reference time. Optionally, the evaluated parameter is for TTIs on one or more carriers/cells. The reference time may be different for the evaluated TTIs. Optionally, the reference time is one slot. Optionally, the parameter may be evaluated separately in each reference time. Optionally, a minimum one of the evaluated parameters is selected.

Certain embodiments of the present disclosure may provide one or more technical advantages. For example, certain embodiments may provide well defined wireless device behavior with respect to configured transmitted power. As another example, a technical advantage may be that the wireless device behavior with respect to configured transmitted power is well defined when different TTI patterns are used in the same cell in different time resources. As still another example, a technical advantage may be that the network node may receive and process signals when a wireless device transmits signals using different maximum power as a function of TTI.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing front the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure.

The invention claimed is:

1. A method by a wireless device for determining a maximum output power, the method comprising:

obtaining, by the wireless device, a first time resource for transmitting a first signal in a first cell on a first carrier;

obtaining, by the wireless device, a second time resource for transmitting a second signal in a second cell on a second carrier;

[based on the first time resource and the second time resource, determining the maximum output power;]

determining a reference time based on at least one of the first time resource and the second time resource;

determining the maximum output power [based on] *to be applied for* the reference time, wherein the reference time is determined as a function of a length of at least one of the first time resource and the second time resource; and wherein the reference time comprises:

a lowest common multiple of a length of the first time resource and a length of the second time resource;

a highest of the length of the first time resource and the length of the second time resource;

a fraction of the length of the first time resource or the length of the second time resource;

a half of the length of the first time resource or the length of the second time resource;

a fraction of a highest of the length of the first time resource or the length of the second time resource; *or* a half of a highest of the length of the first time resource or the length of the second time resource; [or a value configured for at least one of the first time resource and the second time resource;] and based on the determined maximum output power, transmitting the first signal in the first cell and the second signal in the second cell.

2. The method of claim 1, wherein:

the first time resource comprises a first transmission time interval (TTI) or a first mini-slot, and the second time resource comprises a second TTI or a second mini-slot.

3. The method of claim 1, wherein determining the maximum output power comprises determining a maximum output power parameter, and the reference time is an evaluation time period, wherein the maximum output power parameter is evaluated per reference time period (T_eval), wherein the reference time is based on a length of the first time resource and/or the second time resource.

4. The method of claim 3, wherein the maximum output power parameter is PCMAX_L, which is a lower bound for a configured maximum output power.

5. The method of claim 1, wherein the first time resource, second time resource and/or reference time is any of:

one slot, one-mini slot, 2OS, 3OS, 4OS, 7OS or 1 ms.

6. The method of claim 1, further comprising determining a first reference time based on the first time resource;

determining a second reference time based on the second time resource; and determining the maximum output power based on the first reference time and the second reference time.

7. The method of claim 6, wherein:

the first reference time is different from the second reference time, or the first reference time is the same as the second reference time.

8. A wireless device for determining a maximum output power, the wireless device comprising:

a memory storing instructions; and a processor configured to execute the instructions to cause the wireless device to:

obtain a first time resource for transmitting a first signal in a first cell on a first carrier;

obtain a second time resource for transmitting a second signal in a second cell on a second carrier;

[based on the first time resource and the second time resource, determine the maximum output power;]

determine a reference time based on at least one of the first time resource and the second time resource;

determine the maximum output power [based on] *to be applied for* the reference time, wherein the reference time is determined as a function of a length of at least one of the first time resource and the second time resource; and wherein the reference time comprises:

a lowest common multiple of a length of the first time resource and a length of the second time resource;

a highest of the length of the first time resource and the length of the second time resource;

a fraction of the length of the first time resource or the length of the second time resource;

a half of the length of the first time resource or the length of the second time resource;

a fraction of a highest of the length of the first time resource or the length of the second time resource; *or* a half of a highest of the length of the first time resource or the length of the second time resource; [or a value configured for at least one of the first time resource and the second time resource;] and based on the determined maximum output power, transmit the first signal to the first cell and the second signal to the second cell.

9. A method by a network node for determining a maximum output power, the method comprising:

configuring a wireless device with a first time resource for transmitting a first signal in a first cell on a first carrier;

configuring the wireless device with a second time resource for transmitting a second signal in a second cell on a second carrier;

[determining a maximum output power based on the first time resource and the second time resource;]

*determining a reference time based on at least one of the first time resource and the second time resource;*

*determining a maximum output power to be applied for the reference time;* based on the maximum [transmit] *output* power, performing at least one of:

performing, by the network node, at least one radio measurement;

adapting uplink scheduling of at least one of the first signal in the first cell and the second signal in the second cell;

[adapting the first time resource of the wireless device in a downlink or an uplink in the first cell;

adapting the second time resource of the wireless device in the downlink or the uplink in the second cell;]

performing a power control operation of the wireless device in at least one of the first cell and the second cell;

transmitting information about a determined value of the maximum output power to another network node; and transmitting information about [a] *the* reference time [determine based on at least one of the first time resource and the second time resource] to another network node; and based on the maximum output power, receiving, from the wireless device, at least one of the first signal on the first cell and the second signal on the second cell.

10. The method of claim 9, wherein:

the first time resource comprises a first transmission time interval (TTI) or a first mini-slot, and the second time resource comprises a second TTI or a second mini-slot.

[11. The method of claim 9, further comprising:

determining a reference time based on at least one of the first time resource and the second time resource; and determining the maximum output power based on the reference time.]

12. The method of claim [11] *9*, wherein the reference time is determined as a function of a length of at least one of the first time resource and the second time resource.

13. The method of claim [12] *9*, wherein determining the maximum output power comprises determining a maximum output power parameter, PCMAX_L, and the reference time is an evaluation time period, wherein the maximum output power parameter is evaluated per reference time period (T_eval), wherein the reference time is based on a length of the first time resource and/or the second time resource.

14. The method of claim 13, wherein the maximum output power parameter is PCMAX_L, which is a lower bound for a configured maximum output power.

15. The method of claim [11] *9*, wherein the reference time comprises:

a lowest common multiple of a length of the first time resource and a length of the second time resource;

a highest of the length of the first time resource and the length of the second time resource;

a fraction of the length of the first time resource or the length of the second time resource;

a half of the length of the first time resource or the length of the second time resource;

a fraction of a highest of the length of the first time resource or the length of the second time resource;

a half of a highest of the length of the first time resource or the length of the second time resource; or a value configured for at least one of the first time resource and the second time resource.

16. The method of claim 12, wherein the first time resource, second time resource and/or reference time is any of:

one slot, one mini-slot, 2OS, 3OS, 4OS, or 7OS or 1 ms.

17. The method of claim 9, further comprising:

determining a first reference time based on the first time resource;

determining a second reference time based on the second time resource; and determining the maximum output power based on the first reference time and the second reference time.

18. The method of claim 17, wherein:

the first reference time is different from the second reference time, or the first reference time is the same as the second reference time.

19. A network node for determining a maximum output power, the network node comprising:

a memory storing instructions; and a processor configured to execute the instructions to cause the network node to:

configure a wireless device with a first time resource for transmitting a first signal in a first cell on a first carrier;

configure the wireless device with a second time resource for transmitting a second signal in a second cell on a second carrier;

[determine a maximum output power based on the first time resource and the second time resource;]

*determine a reference time based on at least one of the first time resource and the second time resource;*

*determine the maximum output power to be applied for the reference time;* based on the maximum [transmit] *output* power, perform at least one of:

perform, by the network node, at least one radio measurement;

adapt uplink scheduling of at least one of the first signal in the first cell and the second signal in the second cell;

[adapt the first time resource of the wireless device in a downlink or an uplink in the first cell;

adapt the second time resource of the wireless device in the downlink or the uplink in the second cell;]

perform a power control operation of the wireless device in at least one of the first cell and the second cell;

transmit information about a determined value of the maximum output power to another network node; and transmit information about [a] *the* reference time [determine based on at least one of the first time resource and the second time resource] to another network node; and based on the maximum output power, receive, from the wireless device, at least one of the first signal on the first cell and the second signal on the second cell.

* * * * *